US012619059B2

(12) United States Patent
Wang et al.

(10) Patent No.: US 12,619,059 B2
(45) Date of Patent: May 5, 2026

(54) IMAGE ENHANCEMENT SYSTEM AND IMPLEMENTATION METHOD THEREFOR

(71) Applicant: ZUMAX MEDICAL CO., LTD., Suzhou (CN)

(72) Inventors: Jilong Wang, Suzhou (CN); Bobby Nadeau, Suzhou (CN); Jianyue Li, Suzhou (CN); Bin Huang, Suzhou (CN); Jian Chen, Suzhou (CN); Jin He, Suzhou (CN); Tao Qiu, Suzhou (CN); Zhuangzhuang Hu, Suzhou (CN)

(73) Assignee: ZUMAX MEDICAL CO., LTD., Suzhou (CN)

( * ) Notice: Subject to any disclaimer, the term of this patent is extended or adjusted under 35 U.S.C. 154(b) by 280 days.

(21) Appl. No.: 18/570,083

(22) PCT Filed: Jun. 17, 2022

(86) PCT No.: PCT/CN2022/099487
§ 371 (c)(1),
(2) Date: Dec. 14, 2023

(87) PCT Pub. No.: WO2022/262852
PCT Pub. Date: Dec. 22, 2022

(65) Prior Publication Data
US 2024/0280796 A1     Aug. 22, 2024

(30) Foreign Application Priority Data
Jun. 18, 2021    (CN) ......................... 202110680210.X

(51) Int. Cl.
*G02B 21/20*        (2006.01)
*G02B 21/00*        (2006.01)

(52) U.S. Cl.
CPC ......... *G02B 21/20* (2013.01); *G02B 21/0012* (2013.01)

(58) Field of Classification Search
None
See application file for complete search history.

(56) References Cited

U.S. PATENT DOCUMENTS 5,601,549 A     2/1997  Miyagi
6,266,182 B1    7/2001  Morita
(Continued)

FOREIGN PATENT DOCUMENTS

CN         110007455 A      7/2019
CN         216145020 U      3/2022
(Continued)

OTHER PUBLICATIONS

Extended European Search Report received for European Patent Application No. 22824324.2, mailed on Aug. 22, 2024, pp. 9.
(Continued)

*Primary Examiner* — Samira Monshi
(74) *Attorney, Agent, or Firm* — Zhong Law, LLC

(57)        ABSTRACT

The present invention discloses an image enhancement system and an implementation method therefor. The system comprises a media signal processing apparatus, an image enhancement apparatus, a microscope body, and a binocular tube. The image enhancement apparatus comprises a housing, and a display device and a superposition lens group that are disposed in the housing, the display device is connected to the media signal processing apparatus, the superposition lens group is disposed on a main optical path of the microscope body, the binocular tube is disposed on the microscope body, the display device is configured to receive information data sent by the media signal processing apparatus and convert the received information data into an
(Continued)

optical image, the optical image sent by the display device is superposed to the main optical path of the microscope body through the superposition lens group to form a super-posed image, and the superposed image can be observed through the binocular tube. In this application, some images with additional information may be superposed into an observation field of view of a microscope, so that an operator can observe required information more intuitively, and compare, superpose, and fuse the information with a real object under the microscope better, thereby improving operation accuracy and precision.

17 Claims, 16 Drawing Sheets

(56) References Cited

U.S. PATENT DOCUMENTS

| | | |
|---|---|---|
| 2001/0055062 A1 | 12/2001 | Shioda et al. |
| 2002/0118449 A1 | 8/2002 | Spink |
| 2005/0020876 A1 | 1/2005 | Shioda et al. |
| 2008/0123183 A1 | 5/2008 | Awdeh |
| 2017/0143442 A1* | 5/2017 | Tesar ..................... H04N 23/63 |
| 2018/0220889 A1 | 8/2018 | Dirghangi et al. |
| 2021/0097703 A1 | 4/2021 | Chang et al. |

FOREIGN PATENT DOCUMENTS

| | | |
|---|---|---|
| EP | 4282379 A1 | 11/2023 |
| JP | 2013190766 A | 9/2013 |
| JP | 2013231772 A | 11/2013 |
| WO | 2019187449 A1 | 10/2019 |

OTHER PUBLICATIONS

International Search Report and Written Opinion received for International Patent Application No. PCT/CN2022/099487 mailed on Dec. 22, 2022, 9 pages.
"Notice Of Reason For Refusal" received for JP Patent Application No. 2023-577455 shipped on Feb. 25, 2020, pp. 12 including English translation.
Office Action Received for Russian Patent Application No. 2023134483, Outgoing correspondence dated Jul. 16, 2025, 20 Pages.

* cited by examiner

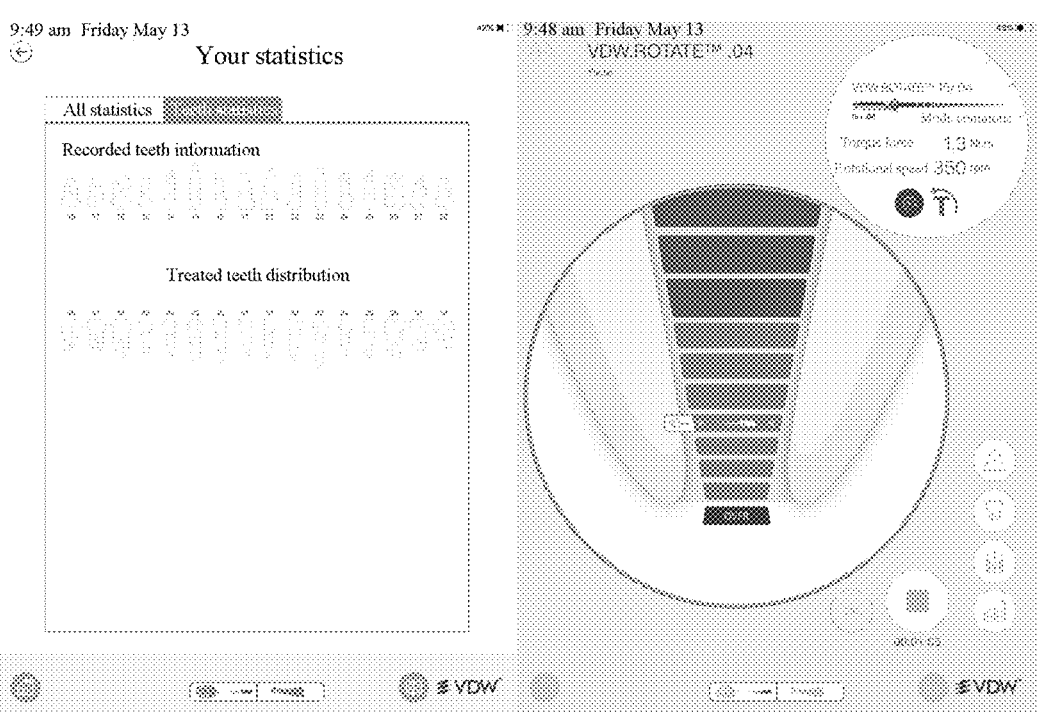

9:49 am  Friday May 13

Your statistics

All statistics

Recorded teeth information

Treated teeth distribution

FIG. 22c

9:48 am  Friday May 13

VDW.ROTATE™ .04

FIG. 22d

9:48 am  Friday May 13

Treatment note

Recorded teeth information

FIG. 22e

9:49 am  Friday May 13

Confirm

Your statistics

Teeth statistics

Treatment statistics

All treatment    58
All patients    0

| | |
|---|---|
| Average treatment time | 21 minutes and 57 seconds |
| Average modification time | 3 minutes and 23 seconds |
| Maximum treatment time | 1 hour, 27 minutes, and 36 seconds |
| Minimum treatment time | 5 seconds |
| Instrument over-operation | 70 % |

File statistics

Quantity of use times

FIG. 22f

IMAGE ENHANCEMENT SYSTEM AND IMPLEMENTATION METHOD THEREFOR

RELATED APPLICATION

This application is a National Stage Application of International Application No. PCT/CN2022/099487 filed on Jun. 17, 2022 which further claims priority from China Patent Application having Ser. No. 20/211,0680210.X respectively filed on Jun. 18, 2021, which is incorporated herein by reference for all purpose.

FIELD OF THE INVENTION

The present invention relates to the field of dental diagnosis and treatment technologies, and in particular, to an image enhancement system of an operating microscope and an implementation method therefor.

BACKGROUND TECHNOLOGY

Modern medicine has made substantive progress in the fields of in vitro diagnosis, micro treatment, medical imaging, minimally invasive treatment, and the like, and diagnosis and treatment means of cross-category and multidisciplinary integration are emerging. Due to the continuous development of medical imaging devices and the rapid development of medical imaging technologies, sub-disciplines of medical imaging such as CT, MR, interventional radiography, ultrasound, and nuclear medicine are gradually established, and a medical imaging technology discipline is also gradually formed.

Medical imaging information is more sensitive, intuitive, specific, and early-stage. Image analysis develops from qualitative to quantitative, and from displaying diagnostic information to providing a surgical path solution. Image camera and display develops from two-dimensional simulation to three-dimensional full digitalization. Image storage develops from film hard copy to soft copy without film, and even image transmission networking; and from a single image technology to an integrated image technology.

To adapt to the digitization, networking, and integration of medical imaging, it is necessary to establish a viewpoint of integrating three majors of diagnosis, technology, and engineering. A single major can no longer complete the functions of the modern medical imaging discipline.

Root canal therapy is used as an example. A doctor needs to completely open a pulp cavity, and find and treat all root canals. A human being generally has one to four root canals per tooth, with a rear tooth having the most root canals. When a root canal orifice of a multi-root canal tooth is difficult to find due to a case such as age-related changes or deposition of reparative dentine, pulp stone, pulp cavity calcification, or root canal morphological variation, an anatomic form of the pulp cavity should be understood and viewed from all directions and positions with the aid of the three-dimensional anatomic form of a tooth. Quantities, shapes, positions, directions, and bending of roots and root canals, a relationship between a root of tooth and a dental crown, and various variation conditions of anatomic forms of the root of tooth and the root canal are learned and pointed out by using X-ray films captured by using a multi-angle projection method. Because a quantity of root canals in some teeth may reach four, there may be complicated cases such as lateral canals, accessory root canals, apical ramification, and apical bifurcation, which may be missed even under magnification observation. It is necessary to estimate a possible position of the root canal. If necessary, a small ball drill may be used to remove a small amount of dentin at a developmental groove where the root canal may or is expected to be located, then a sharp probe may be used to attempt to pierce any calcified region to indicate dentinal collar with a tooth neck being removed in a root canal orifice to expose a position of the root canal orifice. That is, if there is calcification in the root canal orifice and the like, it is more necessary for a doctor to repeatedly explore each possible position, which inevitably removes too much healthy tooth tissue.

At present, a manner of preoperative dental film is often used to help a doctor judge and determine a quantity and shapes of root canals. First, the doctor needs to pay most attention on remembering the shapes of the root canals, and even suspend the operation to observe the dental film again. In addition, because the tooth film is only a two-dimensional planar image, a three-dimensional shape of the root canal cannot be accurately reflected. In fact, a plurality of root canals are bent for a plurality of times, and cannot rely on the tooth film for accurate positioning.

CBCT and other three-dimensional images are complex and difficult to remember. The doctor needs to remember a three-dimensional shape of a tooth structure, and take a lot of effort to compare, stack, and fuse the three-dimensional shape with a real object under a microscope during operation, which is difficult to ensure accuracy and precision.

Therefore, in view of the above existing technical problems, it is necessary to provide a new technical solution.

SUMMARY OF THE INVENTION

To resolve the technical problems existing in the related art, this application provides an image enhancement system of an operating microscope and an implementation method therefor, and a specific solution is as follows.

According to one aspect of the present invention, the present invention provides an image enhancement system, comprising a media signal processing apparatus, an image enhancement apparatus, a microscope body, and a binocular tube, wherein the image enhancement apparatus comprises a housing, a display device, and a superposition lens group, both the display device and the superposition lens group are located in the housing, the display device is communicatively connected to the media signal processing apparatus, the superposition lens group is disposed on a main optical path of the microscope body, the binocular tube is disposed on the microscope body, the display device is configured to receive information data sent by the media signal processing apparatus and convert the received information data into an optical image, the optical image sent by the display device is superposed to the main optical path of the microscope body through the superposition lens group to form a superposed image, and the superposed image can be observed through the binocular tube.

Further, the image enhancement system comprises a plurality of information input apparatuses, wherein the information input apparatuses are respectively communicatively connected to the media signal processing apparatus, and the media signal processing apparatus is configured to convert information data inputted by the plurality of information input apparatuses into composite information data and send the composite information data to the display device.

Further, the display device comprises an information display region, the information display region matches an observation field of view of the binocular tube, and an optical image corresponding to the composite information data converted by the media signal processing apparatus is displayed in the information display region; and the display device is an OLED display, an LCD display, or a DLP display.

Further, the optical image sent by the display device is black in a region outside the optical image corresponding to the composite information data.

Further, the image enhancement system further comprises an adjustment apparatus, wherein the adjustment apparatus is communicatively connected to the media signal processing apparatus, the adjustment apparatus is configured to input adjustment information into the media signal processing apparatus, and the media signal processing apparatus is configured to control, according to the adjustment information, on/off, a size, a position, and an angle of an image that is of the information data inputted by the information input apparatuses and that is displayed in the information display region.

Further, the image enhancement system further comprises an acquisition apparatus, wherein the acquisition apparatus is communicatively connected to the media signal processing apparatus, the acquisition apparatus is configured to acquire biometric feature information of a user in real time, and the media signal processing apparatus is configured to control, according to the biometric feature information, on/off, a size, a position, and an angle of an image that is of the information data inputted by the information input apparatuses and that is displayed in the information display region.

Further, the image enhancement system further comprises an image acquisition apparatus, wherein the image acquisition apparatus is communicatively connected to the media signal processing apparatus, and the image acquisition apparatus is configured to acquire image information in the main optical path of the microscope body in real time and input the image information to the media signal processing apparatus.

Further, the information input apparatus comprises a positioning and navigation device, the positioning and navigation device is mounted on a surgical instrument, the positioning and navigation device is communicatively connected to the media signal processing apparatus, and the positioning and navigation device is configured to acquire position information of the surgical instrument in real time and input the position information into the media signal processing apparatus.

Further, the information input apparatus comprises a root canal measurement device, the root canal measurement device is communicatively connected to the media signal processing apparatus, and the root canal measurement device is configured to measure length information of a root canal of a target tooth and input the length information into the media signal processing apparatus.

Further, the media signal processing apparatus is a mobile terminal.

Further, the media signal processing apparatus is the mobile terminal with a touch screen, and on/off, a size, a position, or an angle of a corresponding image of each piece of information data displayed in the display device is adjusted by touching the touch screen.

Further, the image enhancement system further comprises a terminal support, wherein the media signal processing apparatus is disposed on one side of the image enhancement apparatus or one side of the microscope body through the terminal support.

Further, a wireless charging module for charging the mobile terminal is disposed on the terminal support.

Further, the image enhancement apparatus further comprises a beam splitter group, the beam splitter group is disposed in the housing, a beam splitter interface is provided on one side of the housing, and the beam splitter group is capable of emitting a part of a light beam in the main optical path of the microscope body or a part of a light beam of the superposed image from the beam splitter interface.

Further, the media signal processing apparatus is configured to acquire the light beam emitted from the beam splitter interface.

Further, the media signal processing apparatus is configured to display a three-dimensional model, wherein an angle of the three-dimensional model is adjustable, and/or a size of the three-dimensional model is adjustable, and/or a transparency of the three-dimensional model is adjustable.

Further, the media signal processing apparatus is configured to display a CBCT image, wherein an angle of the CBCT image is adjustable, and/or a size of the CBCT image is adjustable, and/or a transparency of the CBCT image is adjustable.

According to another aspect of the present invention, the present invention also provides an implementation method for an image enhancement system. The implementation method comprising the following steps: importing information data of a target object into a media signal processing apparatus; processing the imported information data, and sending processed information data to a display device of an image enhancement apparatus by the media signal processing apparatus; and receiving the information data, and converting the information data into an optical image for display by the display device, wherein the optical image displayed by the display device enters a superposition lens group on a main optical path of a microscope body through a lens optical path, and the optical image displayed by the display device is superposed to the main optical path to form a superposed image, and then the superposed image enters a binocular tube.

Further, the information data comprises CBCT image data, and after the CBCT image data is imported into the media signal processing apparatus, the media signal processing apparatus parses the CBCT image data, to obtain a three-dimensional image of an oral cavity of the target object, highlights key information in the three-dimensional image of the oral cavity of the target object, generates a four-view image, and selectively displays the four-view image in an information display region of the display device, and a target tooth is selected from any view image in the four-view image, and the media signal processing apparatus generates a three-dimensional image and a cross section cutting view of the selected target tooth, and selectively displays the three-dimensional image and the cross section cutting view in the information display region of the display device.

Further, the information data comprises three-dimensional model data of a target tooth, and after the three-dimensional model data of the target tooth is imported into the media signal processing apparatus, the media signal processing apparatus processes the three-dimensional model data and selectively displays processed three-dimensional model data in an information display region of the display device.

Further, the information data further comprises additional information data, and after the additional information data is imported into the media signal processing apparatus, the media signal processing apparatus processes the additional information data and selectively displays processed additional information data in an information display region of the display device.

Further, when sending the information data to the display device, the media signal processing apparatus first integrates all information data into composite information data, and then sends the composite information data to the display device for display, wherein on/off, a size, a position, and an angle of a corresponding image of each piece of information data displayed in the display device are adjustable.

Further, the step of parsing the CBCT image data by the media signal processing apparatus is as follow: obtaining a folder path in which the CBCT image data is located; obtaining a DICOM sequence and sequence information, wherein the sequence information comprises a sequence path, a quantity of slices, and each picture; selecting a sequence according to the sequence information, adding the sequence to a database, and outputting the sequence path; parsing sequence basic information, storing parsed basic information into a sequence volume data structure, outputting sequence volume data information, and receiving, by a data control thread, the sequence volume data information and controlling image display and interaction, and during four-view image display and interaction, interactively selecting the target tooth on an interface, inputting the selected information into a tooth segmentation module for tooth segmentation, then outputting a divided tooth three-dimensional graph to the data control thread, and continuously maintaining, by the data control thread, image display and interaction.

Further, after the outputting the sequence path, the method further comprises: parsing the sequence basic information, storing the parsed basic information into a sequence slice information base, and outputting the parsed basic information, and receiving, by an instance management module, the parsed basic information, and adding the parsed basic information to the database.

Further, during four-view image display and interaction, an exported path is interactively selected on the interface, the selected information is inputted into a path control module for storing and managing the path, and the data control thread continuously maintains image display and interaction.

Further, an image acquisition apparatus is disposed to acquire image information in the main optical path of the microscope body in real time and input the image information into the media signal processing apparatus, and the media signal processing apparatus performs matching according to the image information acquired by the image acquisition apparatus to obtain a cross section cutting view matching the target tooth in the image information in the main optical path, and superposes the cross section cutting view on an image of the target tooth.

Further, a positioning and navigation device is disposed on a surgical instrument to acquire position information of the surgical instrument in real time and input the position information into the media signal processing apparatus, and the media signal processing apparatus processes image data of the target tooth to obtain an optimal path for operating the target tooth, and then selectively display the position information of the surgical instrument and relative position information between the surgical instrument and the optimal path in the information display region of the display device.

Compared with the related art, the image enhancement system and the implementation method therefor in this application have at least one or more following beneficial effects:

According to the image enhancement system and the implementation method therefor in this application, by using a display device such as an LCD, an OLED, or a DLP and in combination with a light splitting prism, image information displayed in the display device can be superposed to an observation field of view of a microscope, to facilitate an operator to observe a target object and quickly view a variety of data information related to an operation. Compared with a projector, the display such as the LCD, the OLED, or the DLP is smaller in volume, displays a clearer image, consumes less power, and also generates less heat. An HDMI signal may be inputted, and connection is simple and convenient. A structure is compact and does not occupy space. The media signal processing apparatus may be a computer independent of the microscope, or may be a part of the microscope, or may be a mobile terminal with a touch screen such as a touchscreen mobile phone or a tablet computer. The media signal processing apparatus may be configured to preprocess a plurality of signals such as patient case information, an oral holographic scanning image, CT, a CBCT image or 3D modeling information, and a root canal measurement device into one signal, and then output the signal to the display device of the image enhancement apparatus for display. The media signal apparatus may process input CBCT image data through built-in software, re-establish a three-dimensional model of a target tooth, perform slicing processing on the three-dimensional model, and also highlight key parts of the tooth such as a root canal orifice and an edge contour, to allow superposed information to be more clearly observed when a slice image is superposed to a field of view region of an eyepiece. If a mobile terminal with a touch screen such as a touchscreen mobile phone or a tablet computer is used as the media signal processing apparatus, the operator can also conveniently and quickly adjust and control information data such as the CBCT image and the three-dimensional model of the target tooth. Compared with a conventional manner of controlling an image through a computer, the computer is operated by one person with a single hand without being equipped with a single assistant, to avoid inconvenience of a remote operation and greatly improve operation efficiency. In addition, a space occupation problem caused by a relatively large quantity of computer wires and a relatively large screen can be further resolved, the space is saved, and it is more convenient to move the microscope and a cross arm of a support of the microscope without limiting an operation space of the operator and hindering the microscope from moving to an appropriate observation position. A wireless charging module may be disposed on a terminal support, and the mobile terminal can be wirelessly charged at any time, to effectively resolve problems such as long-term work and insufficient power of the mobile terminal. An information display region in the display device such as the LCD, the OLED, or the DLP matches an observation field of view of the microscope, and the information data processed by the media signal processing apparatus is displayed in the information display region, so that it can be ensured that the entire image is superposed to the field of view region of the eyepiece without being cut, and a case that the entire superposed information is displayed in an edge of the field of view and cannot be observed is avoided. A quantity, a size, a position, a direction, an angle, and the like of the superposed information superposed in the field of view region of the eyepiece may be all adjusted as required, to adapt to different habit requirements of operators. The superposed information superposed in the field of view region of the eyepiece may be directly adjusted through a handle, a mouse, a keyboard, or the like, or may be controlled by acquiring biometric feature information such as user voice, a gesture, a facial expression, an eyeball action, a brain nerve wave, and a shape of a mouth, so that the operator completes an operation without a touch skill, and the operation is simple and quick. A region displayed in the display device other than a region in which the superposed information needs to be superposed is displayed in black. In this way, during optical path observation of the binocular tube, the image in the main optical path of the microscope body can be observed, and the image displayed in the display device can also be observed. Root canal therapy is used as an example, a slice image of CBCT of a tooth and a real image in the main optical path of the microscope body may be calibrated and then superposed and displayed, so that a highlighted dental pulp hole image may be superposed on a real tooth image, which greatly facilitates operation positioning for a doctor, reduces an operation difficulty, and improves operation accuracy. In combination with a positioning and navigation device, a surgical instrument can be positioned in real time, thereby further improving the operation accuracy.

BRIEF DESCRIPTION OF THE DRAWINGS

FIG. 21 is a schematic diagram of a position state when an operator operates a root canal measurement device according to Embodiment 2 of this application;

FIG. 22a to FIG. 22g are respectively schematic diagrams of interfaces of root canal measurement device software built in a media signal processing apparatus according to Embodiment 2 of this application;

1—Microscope body, 2—Image enhancement apparatus, 20—Housing, 201—Beam splitter interface, 202—Casing, 203—Backplate, 204—Power supply port, 205—Power switch, 21—Display device, 22—First lens group, 23—Reflecting prism, 24—Diaphragm, 241—Diaphragm adjustment apparatus, 25—Second lens group, 26—Blue light filter, 27—First light splitting prism, 28—Second light splitting prism, 29—Lens base, 3—Binocular tube, 4—Media signal processing apparatus, 5—Field of view region of an eyepiece, 6—Image region, 61—Optical image, 62—Tooth image, 63—Dental pulp hole image, 7—Handle, 71—Confirm key, 72—Cancel key, 73—Multi—direction switch, 74—+key, 75—-key, 76—Function key, 8—Optical adapter, 9—Terminal support, 10—Microscope support, and 11—Root canal measurement device.

DETAILED DESCRIPTION OF THE PREFERRED EMBODIMENTS

To further explain the technical means used in the present invention for achieving the intended objectives and the effects thereof, the following describes in detail specific implementations, structures, features, and effects of the present invention with reference to the accompanying drawings and preferred embodiments.

Embodiment 1

Figure 1:
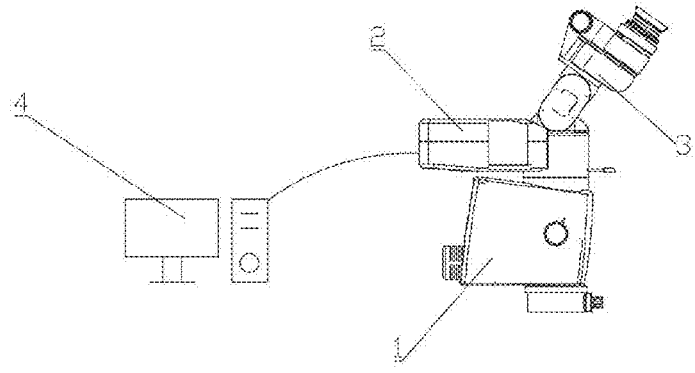
FIG. 1 is a schematic composition diagram of an image enhancement system according to Embodiment 1 of this application.
Figure 2:
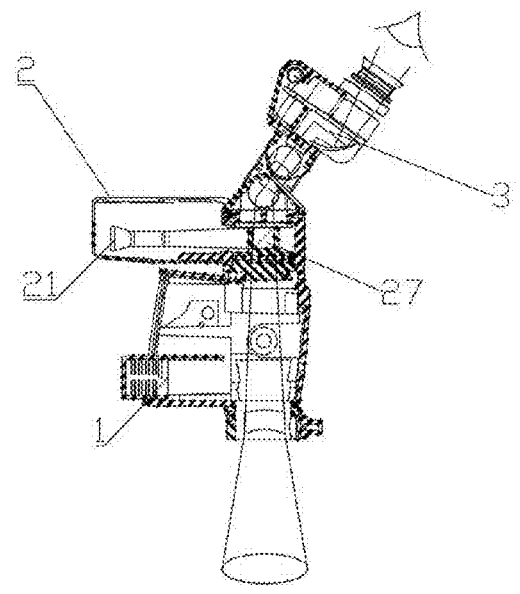
FIG. 2 is a schematic diagram of an optical principle of an image enhancement system according to Embodiment 1 of this application.
Figure 3:
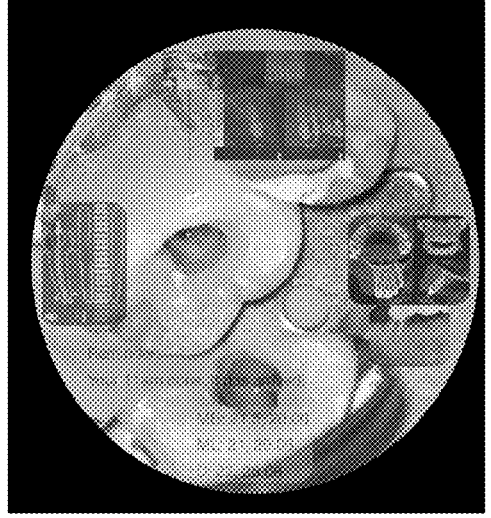
FIG. 3 is an effect diagram of a superposed image that can be observed in a binocular tube according to Embodiment 1 of this application.
Figure 4:
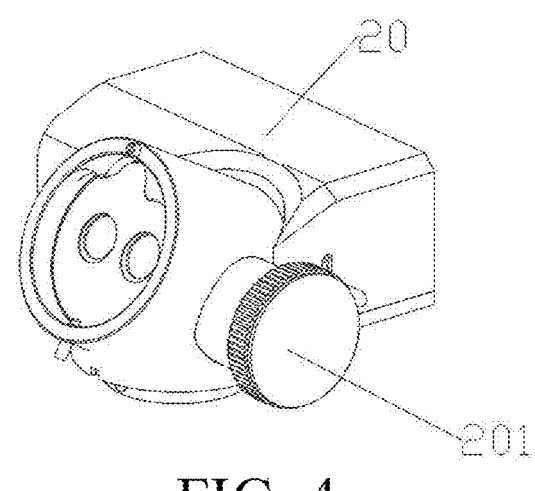
FIG. 4 is a schematic three-dimensional structural diagram of an image enhancement apparatus according to Embodiment 1 of this application.
Figure 5:
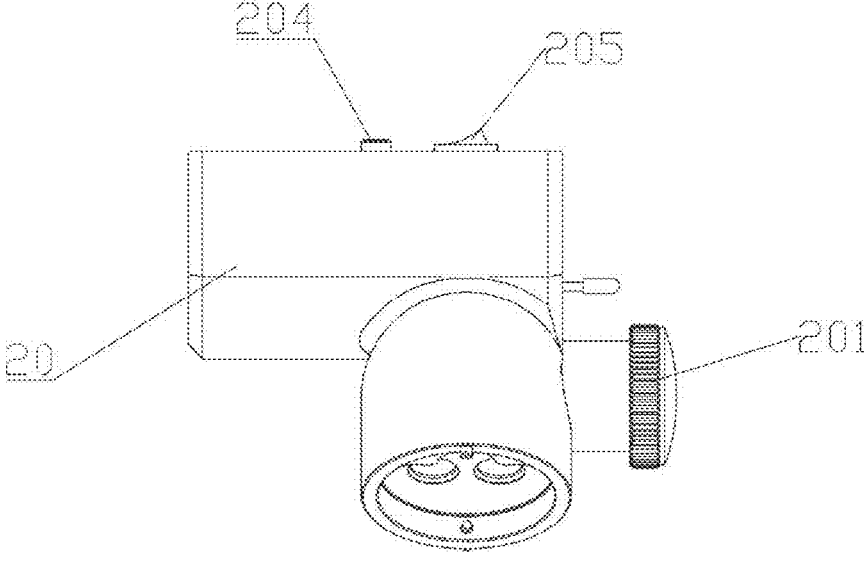
FIG. 5 is a schematic structural top view of the image enhancement apparatus shown in FIG. 4.
Figure 6:
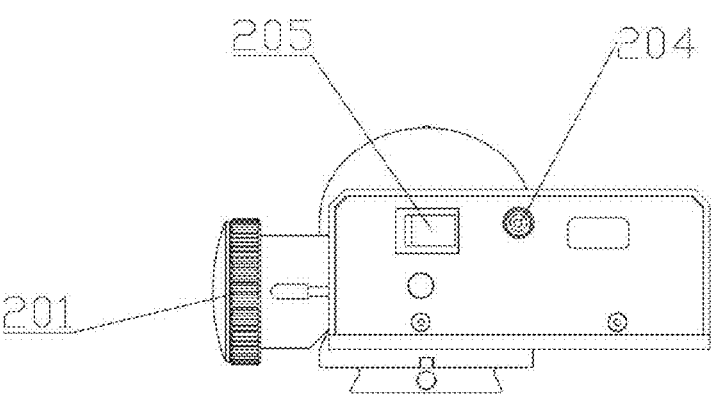
FIG. 6 is a schematic structural rear view of the image enhancement apparatus shown in FIG. 4.

This embodiment provides an image enhancement system, comprising a media signal processing apparatus 4, an image enhancement apparatus 2, a microscope body 1, and a binocular tube 3, as shown in FIG. 1 and FIG. 2. The image enhancement apparatus 2 comprises a display device 21 and a superposition lens group. The display device 21 is communicatively connected to the media signal processing apparatus 4. The superposition lens group is disposed on a main optical path of the microscope body 1. The binocular tube 3 is disposed on the microscope body 1. The display device 21 is configured to receive information data sent by the media signal processing apparatus 4, and convert the received information data into an optical image 61. The optical image 61 sent by the display device 21 is superposed to the main optical path of the microscope body 1 through the superposition lens group to form a superposed image, and the superposed image can be observed through the binocular tube 3. When performing observation through the binocular tube 3, an operator such as a doctor can see not only an image of a diagnosis surface of the main optical path of a microscope, but also additional media information of the display device 21 superposed on the main optical path, as shown in FIG. 3, so that more information is obtained to improve efficiency of diagnosis or operation of the doctor and shorten an operation time.

The media signal processing apparatus 4 may process a plurality of media signals, comprising a plurality of multimedia signals that need to be inputted such as patient case information, an oral cavity holographic scanning image, CT, a CBCT image or 3D modeling information, and a root canal measurement device. The multimedia signals may be inputted through a plurality of information input apparatuses. The information input apparatuses are respectively communicatively connected to the media signal processing apparatus 4. The media signal processing apparatus 4 is configured to convert information data inputted by the plurality of information input apparatuses into composite information data and send the composite information data to the display device 21. That is, if the superposed media signal is not one signal, the media signal processing apparatus 4 preprocesses the plurality of signals. When the plurality of signals are processed by the media signal processing apparatus, the plurality of input media signals are expressed into one video output signal, and are inputted into the display device 21 of the image enhancement apparatus 2 through the video signal, to implement real-time input of the plurality of signals.

The image enhancement apparatus 2 specifically comprises the display device 21, a first lens group 22, a reflecting prism 23, a diaphragm 24, a second lens group 25, a blue light filter 26, and a first light splitting prism 27, as shown in FIG. 4 to FIG. 7. The first light splitting prism 27 is the superposition lens group. All the display device 21, the first lens group 22, the reflecting prism 23, the diaphragm 24, the second lens group 25, the blue light filter 26, and the first light splitting prism 27 are disposed in the housing 20. Further, the first lens group 22, the reflecting prism 23, and the second lens group 25 are respectively mounted in the housing 20 through a lens base 29. The display device 21, the first lens group 22, and the reflecting prism 23 are sequentially disposed on a same optical path, that is, an optical path in a horizontal direction shown in FIG. 7. The reflecting prism 23 is preferably a corner cube prism. The reflecting prism 23, the second lens group 25, the blue light filter 26, and the first light splitting prism 27 are sequentially disposed on a same optical path, that is, an optical path in a vertical direction shown in FIG. 7. A light beam emitted by the display device 21 passes through the first lens group 22, then is totally reflected by the corner cube prism, is rotated by 90 degrees, is incident to the second lens group 25, then passes through the second lens group 25, and is incident to the first light splitting prism 27. During specific implementation, the first light splitting prism 27 is disposed in the main optical path of the microscope. When being incident to the first light splitting prism 27, the light beam emitted by the display device 21 is superposed to the main optical path of the microscope to form a composite optical image, and then an operator can observe, through an eyepiece of the microscope, a superposed image superposed with content displayed in the display device 21. The blue light filter 26 is disposed between the second lens group 25 and the first light splitting prism 27 and may filter blue light within a band 420 nm to 480 nm, to reduce damage to eyes of the operator. The diaphragm 24 is disposed between the reflecting prism 23 and the second lens group 25 and may cut off or form an optical path, to display or close the superposed image as required. Specifically, a diaphragm adjustment apparatus 241 is disposed in the housing 20, and the diaphragm 24 can be driven to move between a shielding position and an open position by adjusting the diaphragm adjustment apparatus 241. When the diaphragm 24 is located at the shielding position, the diaphragm 24, the reflecting prism 23, and the second lens group 25 are located on a same optical path, and the diaphragm 24 shields a light beam that passes through the reflecting prism 23 and then is incident to the second lens group 25. An adjustment manner of the diaphragm 24 may be horizontal cutting-in or rotary cutting-in. Any adjustment manner that can implement a cutting-in optical path and a cutting-out optical path of the diaphragm 24 falls within the protection scope of this application.

Figure 8:
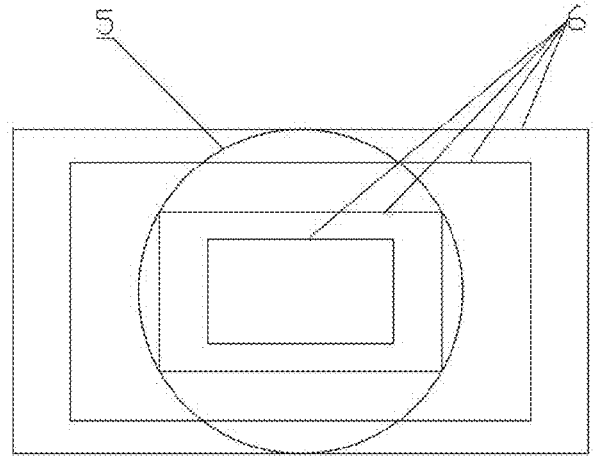
FIG. 8 is a schematic diagram of positions of a superposed images and a field of view of a microscope according to Embodiment 1 of this application.
Figure 9:
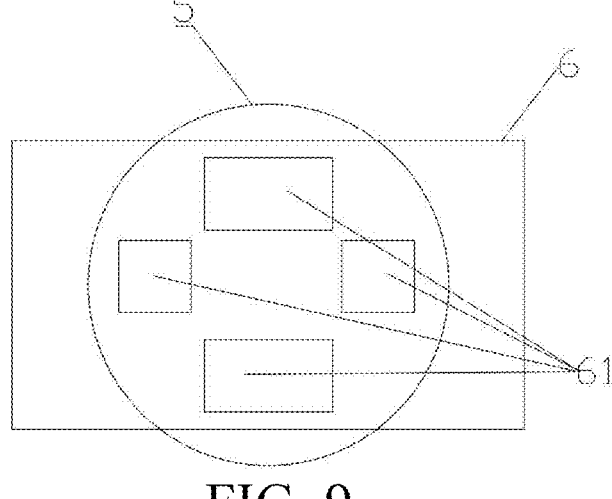
FIG. 9 is a schematic diagram of a position of an optical image in a field of view of a microscope according to Embodiment 1 of this application.
Figure 10:
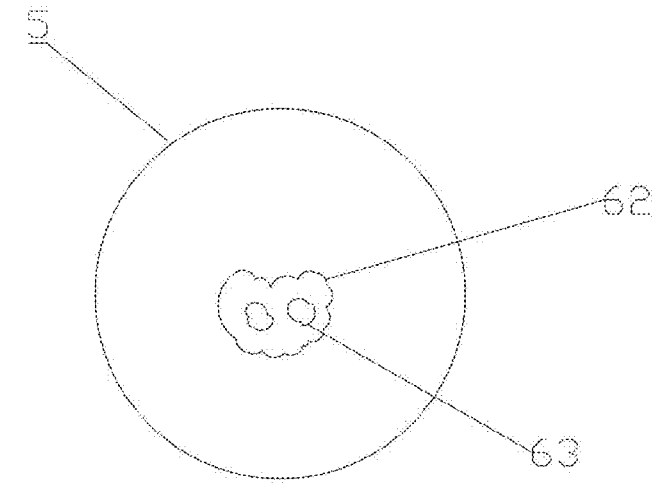
FIG. 10 is a schematic diagram in which a dental pulp hole is superposed on a real tooth image according to Embodiment 1 of this application.
Figure 11:
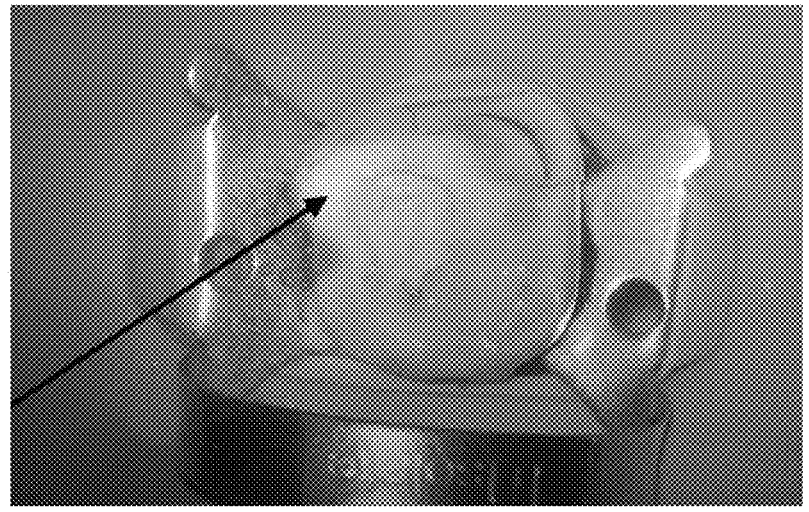
FIG. 11 is an effect diagram of a real dental pulp superposed picture according to Embodiment 1 of this application.

The display device 21 may be an OLED display, an LCD display, a DLP display, or another display or display screen. Compared with a projector, a display such as an LCD, an OLED, or a DLP is smaller in volume, displays a clearer image, consumes less power, and also generates less heat. An HDMI signal may be inputted, and connection is simple and convenient. A structure is compact and does not occupy space. Because a field of view region 5 of an eyepiece observed by using the binocular tube 3 is a complete circular shape, but the display device 21 such as the LCD display is mostly a rectangular device, and a display size ratio of the LCD is generally 16:9 or 4:3, superposing an image region 6 processed by an optical lens on the circular field of view region 5 of the eyepiece involves a cutting problem, as shown in FIG. 8. To resolve this problem, an information display region is disposed in the image region 6 of the display device 21, so that when an optical image 61 sent by the display device 21 is superposed on the main optical path, the information display region matches an observation field of view of the binocular tube 3, and the optical image 61 corresponding to composite information data converted by the media signal processing apparatus 4 is displayed in the information display region. In this way, the entire optical image can be superposed into the field of view region 5 of the eyepiece without being cut, as shown in FIG. 9. If the optical image is displayed at an edge, the optical image cannot be observed by using the eyepiece. Further, the optical image 61 sent by the display device 21 is black in a region outside the optical image 61 corresponding to the composite information data. That is, when the main optical path of the operating microscope body 1 and an optical path of the display device 21 need to be superposed, an image to be superposed is displayed in the information display region, and a peripheral blank region is blackened, so that during optical path observation of the binocular tube 3, the image in the main optical path of the microscope body 1 can be observed, and the image displayed in the display device 21 can also be observed. Root canal therapy is used as an example, a slice image of CBCT of a tooth and a real image in the main optical path of the microscope body 1 may be calibrated and then superposed and displayed, so that a highlighted dental pulp hole image 63 may be superposed on a real tooth image 62, as shown in FIG. 10, which greatly facilitates operation positioning for a doctor, reduces an operation difficulty, and improves operation accuracy. FIG. 11 is an effect diagram in which a dental pulp is superposed with a real picture, wherein an arrow in the figure points to a dental pulp hole.

Figure 12:
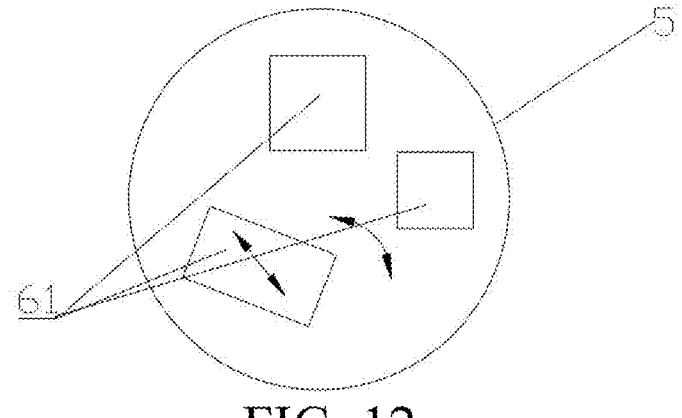
FIG. 12 is a schematic diagram in which a size and an angle of an optical image are adjustable according to Embodiment 1 of this application.
Figure 13:
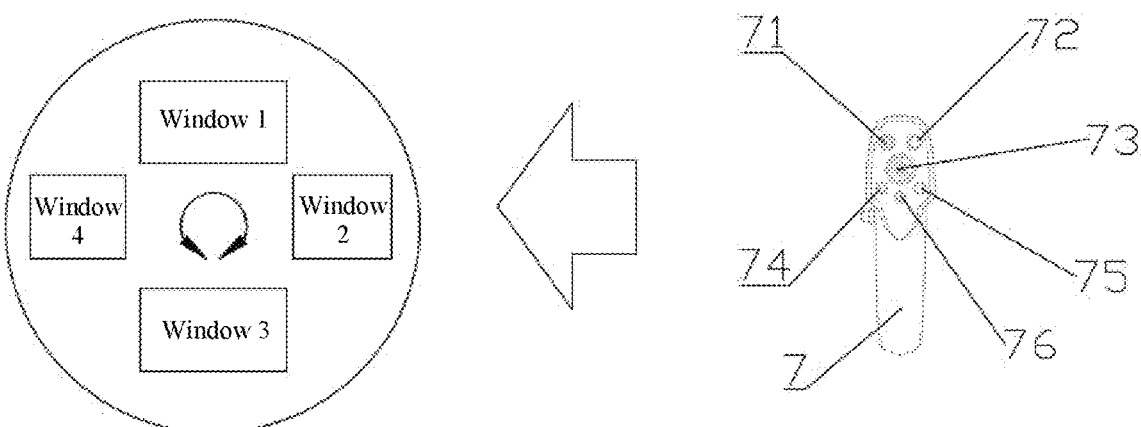
FIG. 13 is a schematic diagram in which a multimedia window is adjusted by using a handle according to Embodiment 1 of this application.
Figure 14:
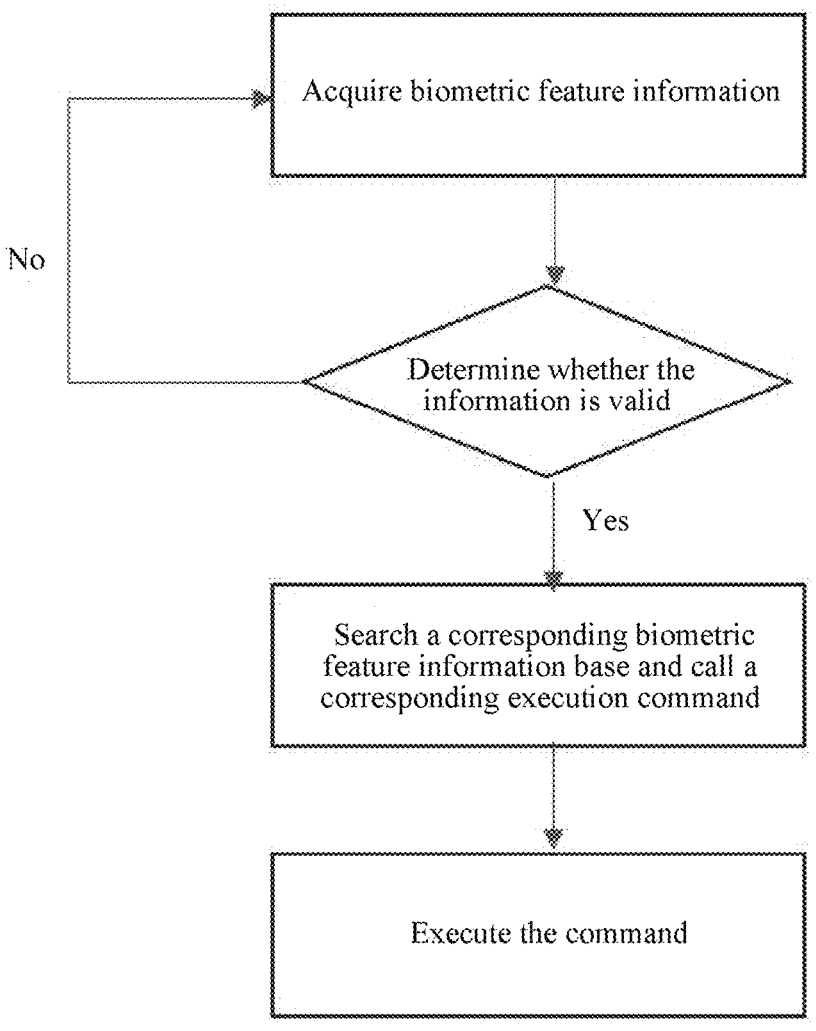
FIG. 14 is a schematic flowchart of adjusting a displayed image in a display region through recognition of biometric feature information according to Embodiment 1 of this application.

Information data, that is, a plurality of input media signals, may be a picture, operable and marked two-dimensional or three-dimensional data, or data that can be intuitively observed such as dynamic information of the root canal measurement device, and may be displayed in the information display region in a form of window. A quantity, sizes, positions, angles, and the like of windows may be all freely edited, to adapt to different use habit requirements of doctors. Specifically, the adjustment may be implemented through an adjustment apparatus. The adjustment apparatus is communicatively connected to the media signal processing apparatus 4, the adjustment apparatus is configured to input adjustment information into the media signal processing apparatus 4, and the media signal processing apparatus 4 is configured to control, according to the adjustment information inputted by the adjustment apparatus, on/off, a size, a position, and an angle of an image that is of the information data inputted by the information input apparatuses and that is displayed in the information display region, and then display each piece of information data in an effective information display region, as shown in FIG. 12. The media signal processing apparatus 4 may be a computer independent of the microscope, as shown in FIG. 1, or may be a processing device integrated with the microscope. When parameters such as a displayed size and position of each piece of information data are adjusted, displayed on/off, size, position, and angle of each piece of information data may be adjusted by using a mouse and a keyboard as the adjustment apparatus through an external computer. Certainly. displayed on/off, size, position, angle, and the like of each piece of information data may alternatively be controlled by using a processing device built in the microscope such as a handle 7 of the microscope. As shown in FIG. 13, a system may be switched to a window editing mode after a function key 76 is pressed for three seconds, a window to be edited is selected by using a multi-direction switch 73, one window may be selected by pressing a confirm key 71, and then the function key 76 is pressed to perform selection among windows of size, position, angle, and on/off functions. If the window of the size function is selected, the window is increased by pressing a "+key 74", the window reduced by pressing a "–key 75", and then the confirm key 71 is pressed to confirm that window size editing ends. During editing, a cancel key 72 may be pressed to cancel editing. Alternatively, on/off, size, position, and angle of each piece of information data may be adjusted by recognizing biometric feature information of a user. An acquisition apparatus is disposed, and the acquisition apparatus is communicatively connected to the media signal processing apparatus 4. The acquisition apparatus is configured to acquire biometric feature information of a user in real time, and the media signal processing apparatus 4 is configured to control, according to the biometric feature information, on/off, a size, a position, and an angle of an image that is of the information data inputted by the information input apparatuses and that is displayed in the information display region. The biometric feature information of the user may be user voice, a gesture, a facial expression, an eyeball action, a brain nerve wave, a shape of a mouth, and the like. In this way, the operator can complete an operation without touching, and the operation is simple and quick. A specific control process is shown in FIG. 14. The biometric feature information is first acquired, and then it is determined whether the information is valid. If the information is valid, a corresponding biometric feature information base is searched, a corresponding execution command is called, and the command is executed, and if the information is invalid, the step of acquiring the biometric feature information is returned.

In a further embodiment, when a slice image of CBCT of a target tooth is superposed to a real image of the target tooth, an image acquisition apparatus may be disposed to acquire image information in the main optical path of the microscope body 1 in real time. The image acquisition apparatus is communicatively connected to the media signal processing apparatus 4. The image acquisition apparatus inputs the real-time acquired image information in the main optical path of the microscope body 1 into the media signal processing apparatus 4. The media signal processing apparatus 4 performs matching according to the image information acquired by the image acquisition apparatus to obtain a cross section cutting view matching the target tooth in the image information in the main optical path, and superposes the cross section cutting view on the real image of the target tooth, thereby greatly reducing an operation positioning difficulty for a doctor and improving operation accuracy.

In a further embodiment, the information input apparatus may comprise a positioning and navigation device. The positioning and navigation device is mounted on a surgical instrument, and the surgical instrument is, for example, a handpiece (a dental drill). The positioning and navigation device is communicatively connected to the media signal processing apparatus 4. The positioning and navigation device is disposed on the surgical instrument to acquire position information of the surgical instrument in real time and input the position information into the media signal processing apparatus 4. The media signal processing apparatus 4 processes image data of the target tooth to obtain an optimal path for operating the target tooth, and then selectively display the position information of the surgical instrument and relative position information between the surgical instrument and the optimal path in the information display region of the display device 21. For example, position information of the handpiece (the dental drill) may be displayed in a window in the information display region. Alternatively, position image information between a path point and the handpiece (the dental drill) is displayed in a window in the information display region, to prompt the operator whether a head of the handpiece (the dental drill) deviates from the path point.

In a further embodiment, the information input apparatus may comprise a root canal measurement device 11, and the root canal measurement device 11 is communicatively connected to the media signal processing apparatus 4. The root canal measurement device 11 is configured to measure length information of a root canal of a target tooth and send the length information to the media signal processing apparatus 4. The media signal processing apparatus 4 processes the length information, and then selectively displays the length information of the root canal measured by the root canal measurement device 11 in the information display region of the display device 21.

The housing 20 preferably comprises a casing 202 and a backplate 203. Elements such as a power switch 205 and a power supply port 204 are disposed on the backplate 203. The power supply port 204 and the power switch 205 are respectively electrically connected to the display device 21 and configured to supply power to the display device 21 and control on and off of the display device.

Figure 7:
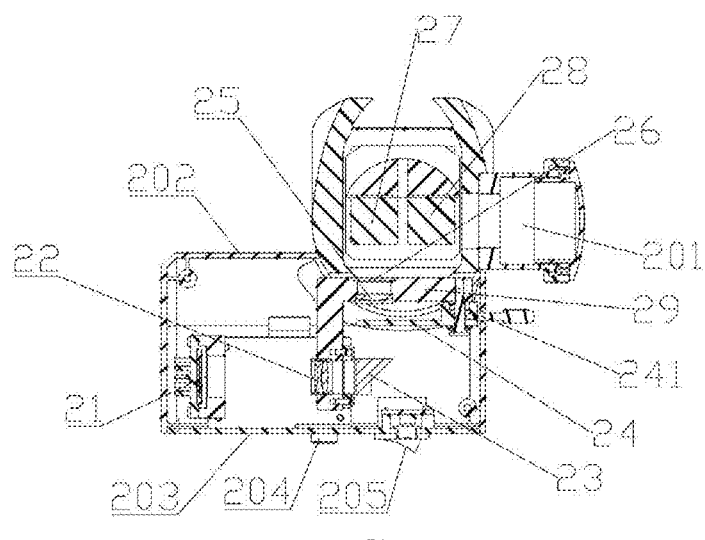
FIG. 7 is a schematic cross-sectional structural diagram of an image enhancement apparatus according to Embodiment 1 of this application.

In a further embodiment, a beam splitter interface 201 is provided on one side of the housing 20, and a second light splitting prism 28, that is, a light beam splitter group, is disposed at a position in the housing 20 close to the beam splitter interface 201, as shown in FIG. 7. Some light beams in the main optical path of the microscope or some light beams of the superposed image in the microscope are emitted from the beam splitter interface 201. An instrument such as a digital camera or a digital video camera is connected to the beam splitter interface 201 and may record the image in the microscope. Preferably, a split ratio of the first light splitting prism 27 to the second light splitting prism 28 is 1:9.

Figure 15:
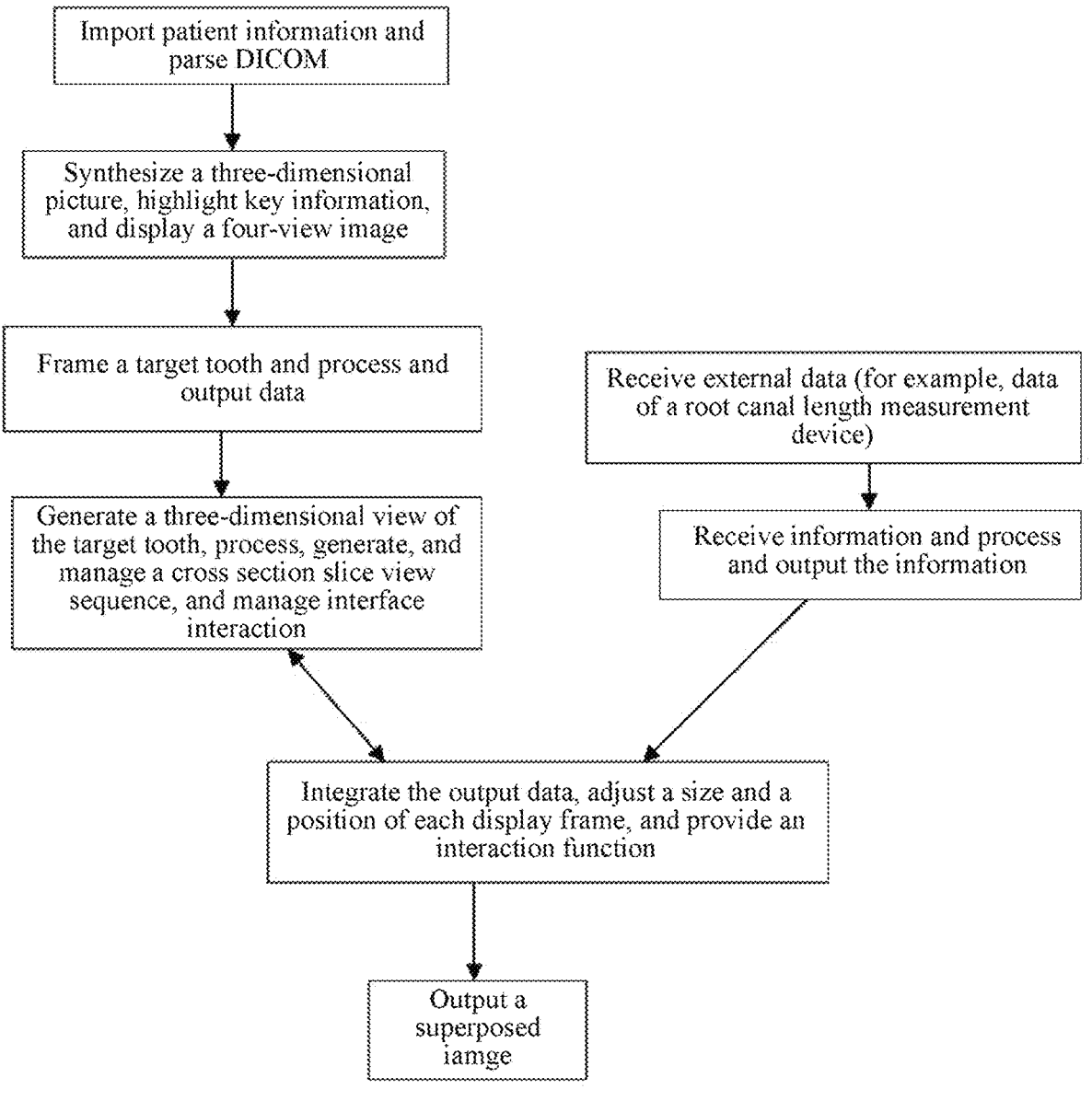
FIG. 15 is a schematic flowchart of an implementation method for an image enhancement system according to Embodiment 1 of this application.

An implementation method for the image enhancement system mainly comprises the following steps shown in FIG. 15: importing information data of a target object into a media signal processing apparatus 4; parsing the imported information data, and sending processed information data to a display device 21 of an image enhancement apparatus 2 by the media signal processing apparatus 4; receiving the information data, and converting the information data into an optical image 61 for display by the display device 21. The optical image 61 displayed by the display device 21 is incident to the superposition lens group on a main optical path of a microscope body 1 through a lens optical path, and the optical image 61 displayed by the display device 21 is superposed to the main optical path to form a superposed image, and then the superposed image is incident to the binocular tube 3.

The information data is, for example, a CBCT image (DICOM) of a patient. After CBCT image data is imported into the media signal processing apparatus 4, the media signal processing apparatus 4 parses the CBCT image data, to obtain a three-dimensional image of an oral cavity of a target object, highlights key information in the three-dimensional image of the oral cavity of the target object, generates a four-view image, and selectively displays the four-view image in an information display region of the display device 21. A target tooth is selected from any view image in the four-view image, and the media signal processing apparatus 4 generates a three-dimensional image and a cross section cutting view of the selected target tooth, processes, generates, and manages a cross section slice view sequence, manages interface interaction, and selectively displays the three-dimensional image and the cross section cutting view in the information display region of the display device 21.

The information data further comprises additional information data, for example, data of the root canal measurement device. After the additional information data is imported into the media signal processing apparatus 4, the media signal processing apparatus 4 processes the additional information data and selectively displays processed additional information data in an information display region of the display device 21.

When sending the information data to the display device 21, the media signal processing apparatus 4 first integrates all information data into composite information data, and then sends the composite information data to the display device 21 for display, wherein on/off, a size, a position, and an angle of a corresponding image of each piece of information data displayed in the display device 21 are adjustable. The superposed image is finally outputted.

Figure 16:
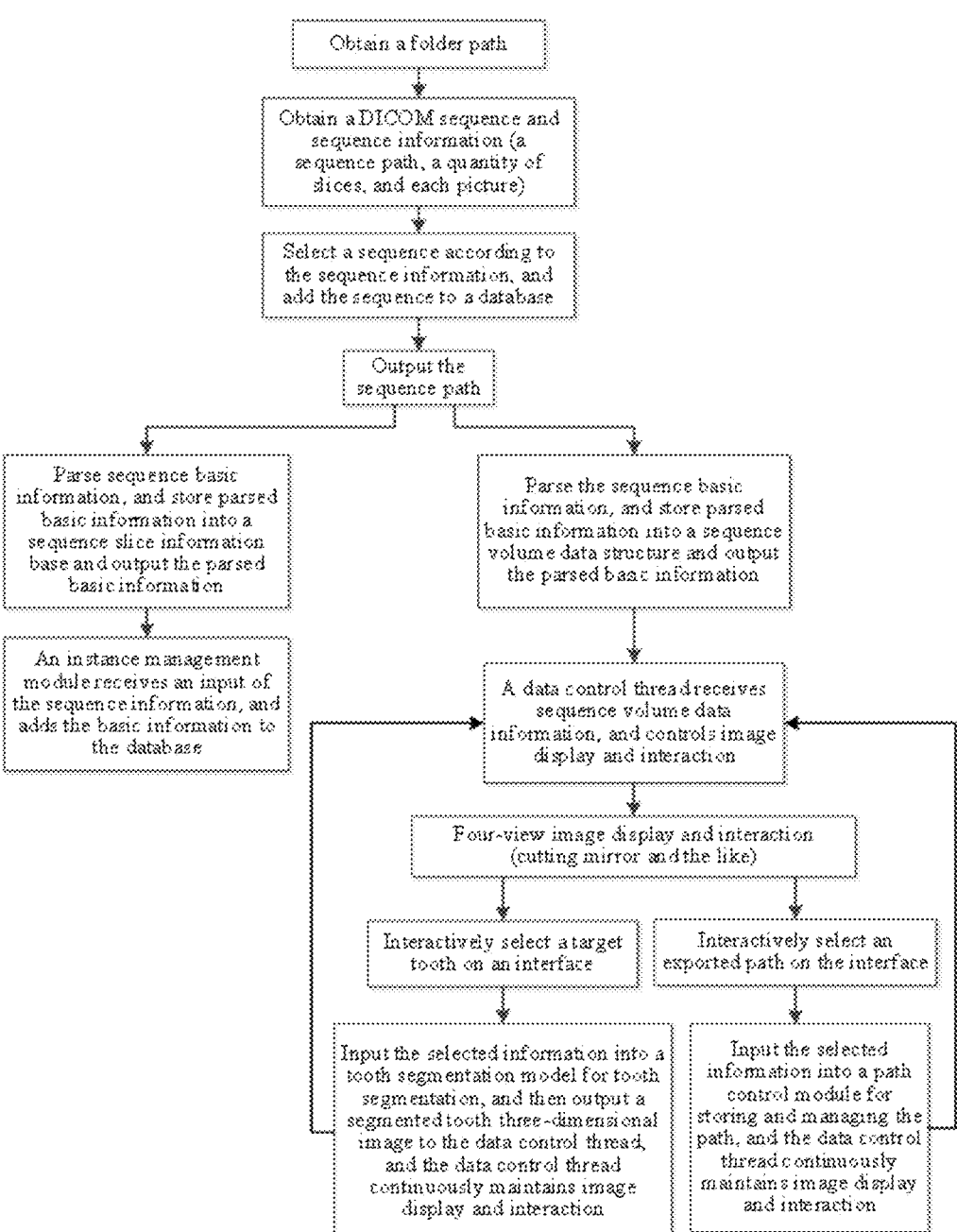
FIG. 16 is a schematic flowchart of parsing CBCT image data according to Embodiment 1 of this application.

Further, the step of parsing, by the media signal processing apparatus 4, the CBCT image data is as follow, wherein a process step is shown in FIG. 16: obtaining a folder path in which the CBCT image data is located; obtaining a DICOM sequence and sequence information, wherein the sequence information comprises a sequence path, a quantity of slices, and each picture; selecting a sequence according to the sequence information, adding the sequence to a database, and outputting the sequence path; and parsing sequence basic information, storing parsed basic information into a sequence volume data structure, outputting sequence volume data information, receiving, by a data control thread, the sequence volume data information and controlling image display and interaction, during four-view image display and interaction, interactively selecting the target tooth on an interface, inputting the selected information into a tooth segmentation module for tooth segmentation, then outputting a divided tooth three-dimensional graph to the data control thread, and continuously maintaining, by the data control thread, image display and interaction.

After the outputting the sequence path, the method further comprises: parsing the sequence basic information, storing the parsed basic information into a sequence slice information base, and outputting the parsed basic information, and receiving, by an instance management module, the parsed basic information, and adding the parsed basic information to the database.

During four-view image display and interaction, an exported path is interactively selected on the interface, the selected information is inputted into a path control module for storing and managing the path, and the data control thread continuously maintains image display and interaction.

Further, an image acquisition apparatus are disposed to acquire image information in the main optical path of the microscope body 1 in real time and input the image information into the media signal processing apparatus 4, and the media signal processing apparatus 4 performs matching according to the image information acquired by the image acquisition apparatus to obtain a cross section cutting view matching the target tooth in the image information in the main optical path, and superposes the cross section cutting view on an image of the target tooth.

Further, a positioning and navigation device is disposed on a surgical instrument to acquire position information of the surgical instrument in real time and input the position information into the media signal processing apparatus 4, and the media signal processing apparatus 4 processes image data of the target tooth to obtain an optimal path for operating the target tooth, and then selectively displays the position information of the surgical instrument and relative position information between the surgical instrument and the optimal path in the information display region of the display device 21.

Embodiment 2

Figure 17:
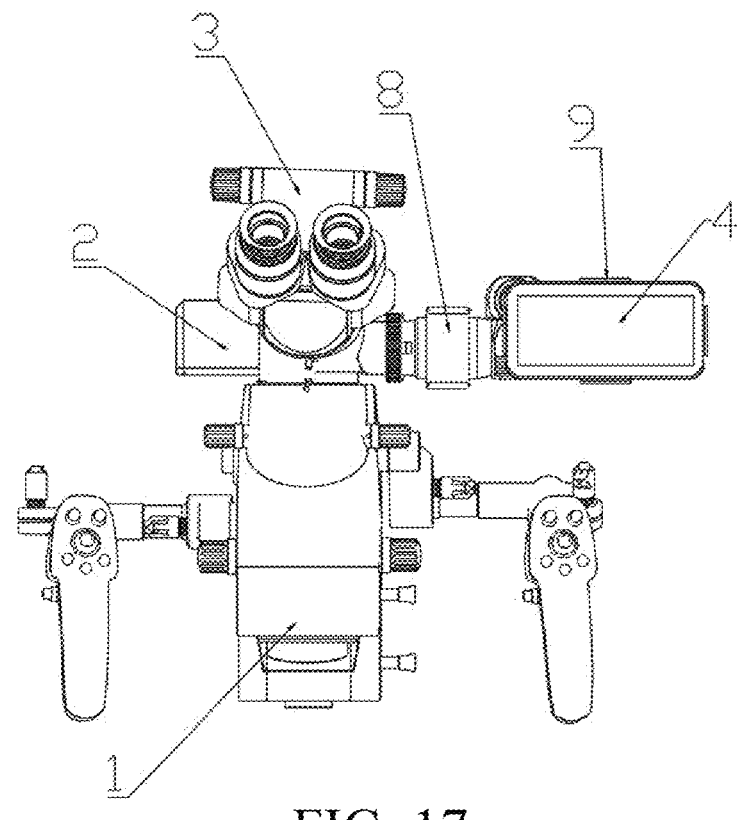
FIG. 17 and FIG. 18 are respectively schematic composition diagrams of an image enhancement system according to Embodiment 2 of this application.
Figure 18:
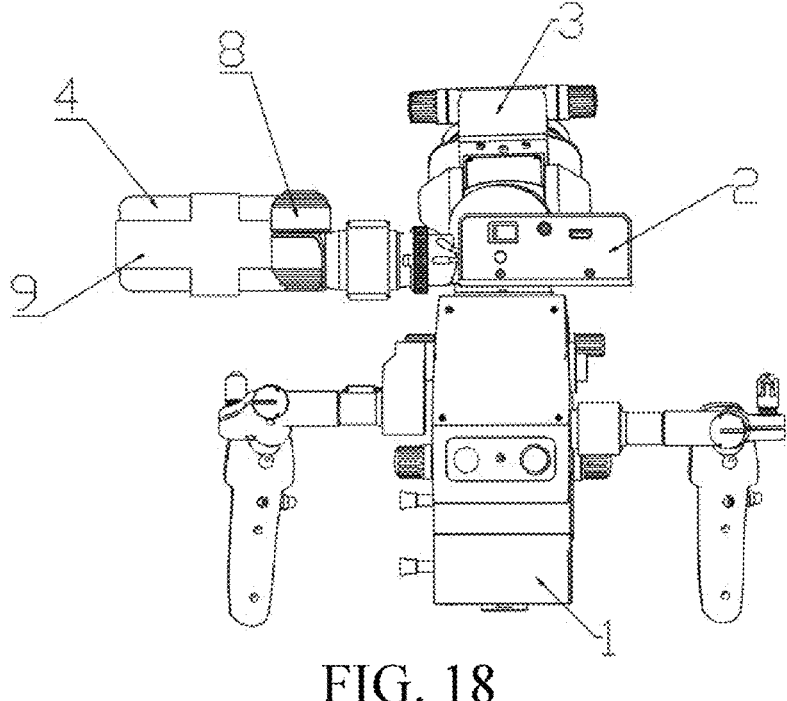
Figure 19:
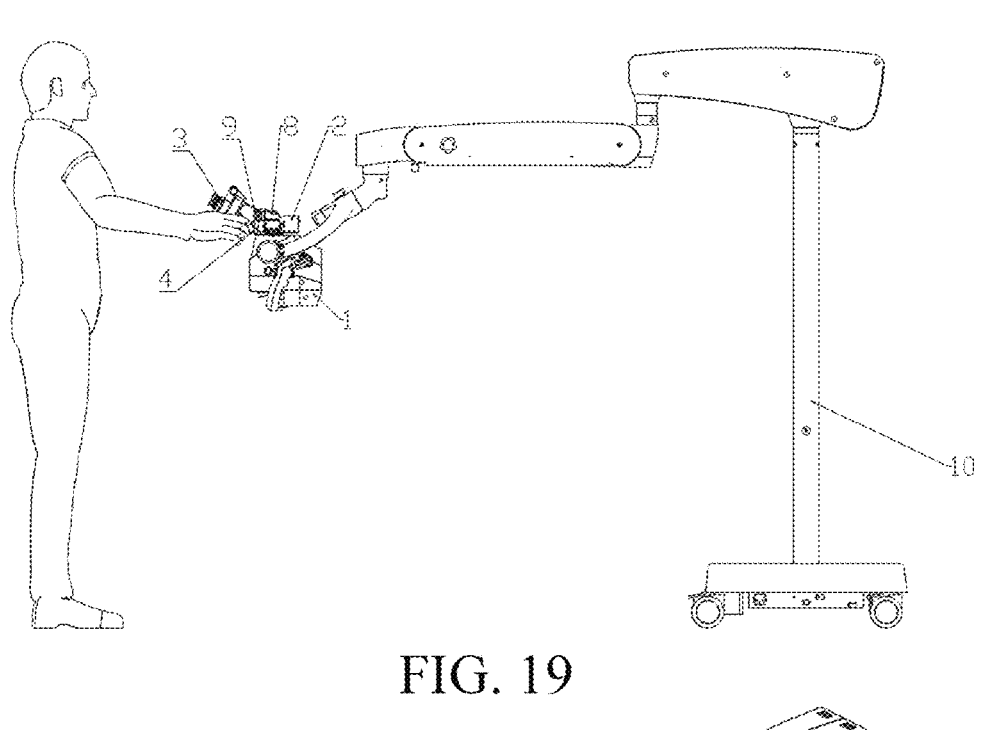
FIG. 19 and FIG. 20 are respective schematic diagrams of position states when an operator operates an operating microscope with a microscope support according to Embodiment 2 of this application.
Figure 20:
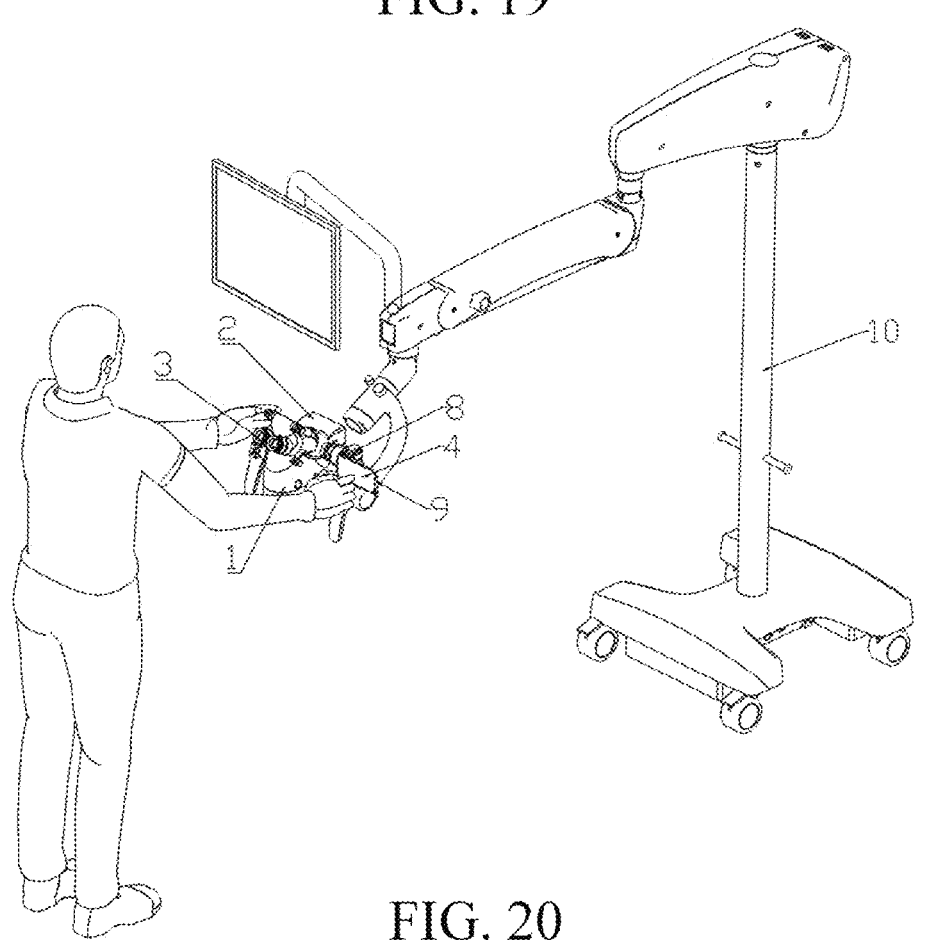
Figures 21, 22A, 22B:
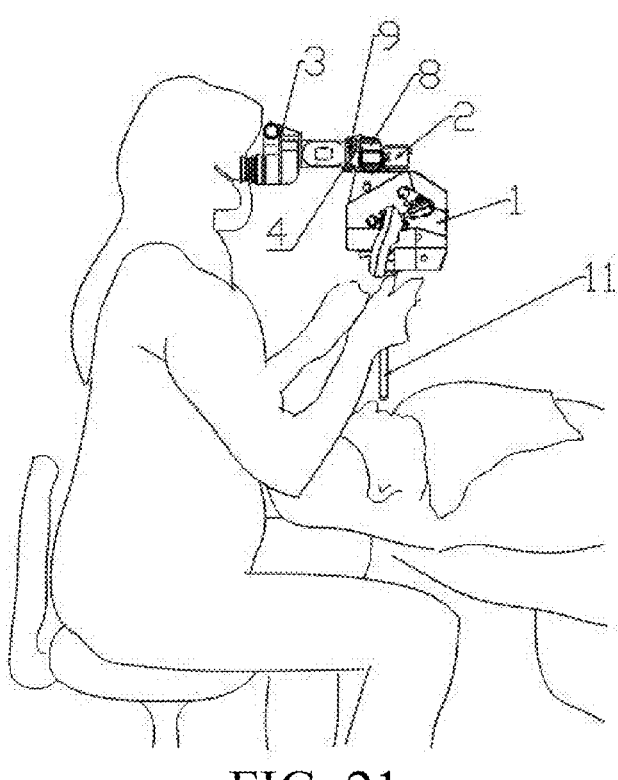
Figure 22G:
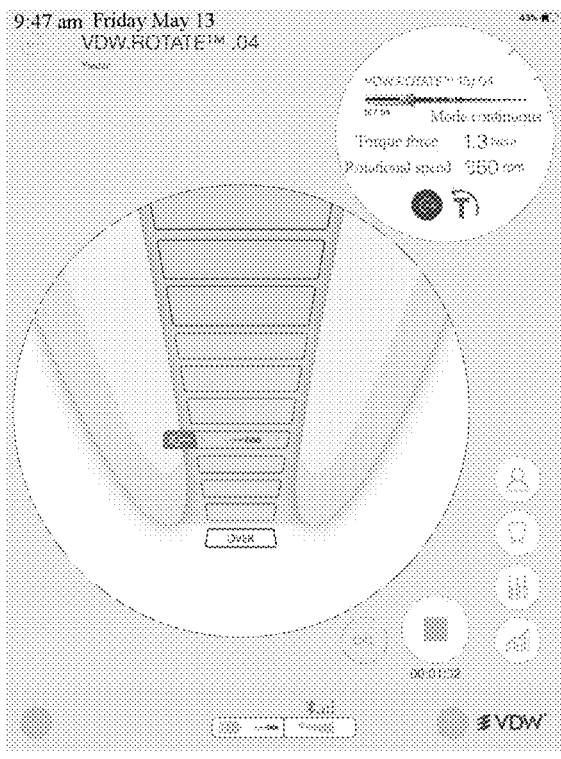

Different from Embodiment 1, in this embodiment, the media signal processing apparatus 4 is a mobile terminal and preferably a touchscreen mobile phone, a tablet computer, or the like with a touch screen. On/off, a size, a position, an angle, or the like of a corresponding image of each piece of information data displayed in the display device 21 is adjusted by touching the touch screen. FIG. 17 and FIG. 18 schematically show an arrangement manner of the media signal processing apparatus 4. That is, an optical adapter 8 is externally connected to the beam splitter interface 201, and then a terminal support 9 is disposed on the optical adapter 8 and is located on one side of the image enhancement apparatus 2. For a specific structure and a working principle of the optical adapter 8 and a connection manner between the terminal support 9 and the optical adapter 8, reference may be made to the patent CN207253386U or CN110651214B previously applied by the applicant, and details are not described again herein. In this way, the media signal processing apparatus 4 may be closer to the operator, as shown in FIG. 19 to FIG. 21. FIG. 19 and FIG. 20 schematically show position states when an operator operates an operating microscope with a microscope support 10. The mobile terminal is used as the media signal processing apparatus 4, and the operator can more conveniently operate the media signal processing apparatus 4 by one hand without being equipped with a single assistant to operate a computer, thereby avoiding inconvenience of a remote operation and greatly improving operation efficiency. FIG. 21 schematically shows a position state when an operator performs tooth root canal measurement on a patient. The mobile terminal is used as the media signal processing apparatus 4, and the operator can conveniently observe data parameter information of the root canal measurement device 11 in the media signal processing apparatus 4 when measuring the tooth root canal of the patient by using the root canal measurement device 11. Specifically, root canal measurement device software is built in the media signal processing apparatus 4. The media signal processing apparatus 4 is wirelessly connected to the root canal measurement device 11 through Bluetooth, that is, software is operated in the media signal processing apparatus 4 to call and display information such as a torque force, a rotational speed, and a treatment record of the root canal measurement device 11, and adjust the torque force, the rotational speed, and the like of the root canal measurement device 11, as shown in FIG. 22*a* to FIG. 22*g*.

Certainly, the media signal processing apparatus 4 may alternatively be disposed at any position closer to the operator through the terminal support 9, for example, the terminal support 9 is directly fixed on the microscope body 1.

Figure 23:
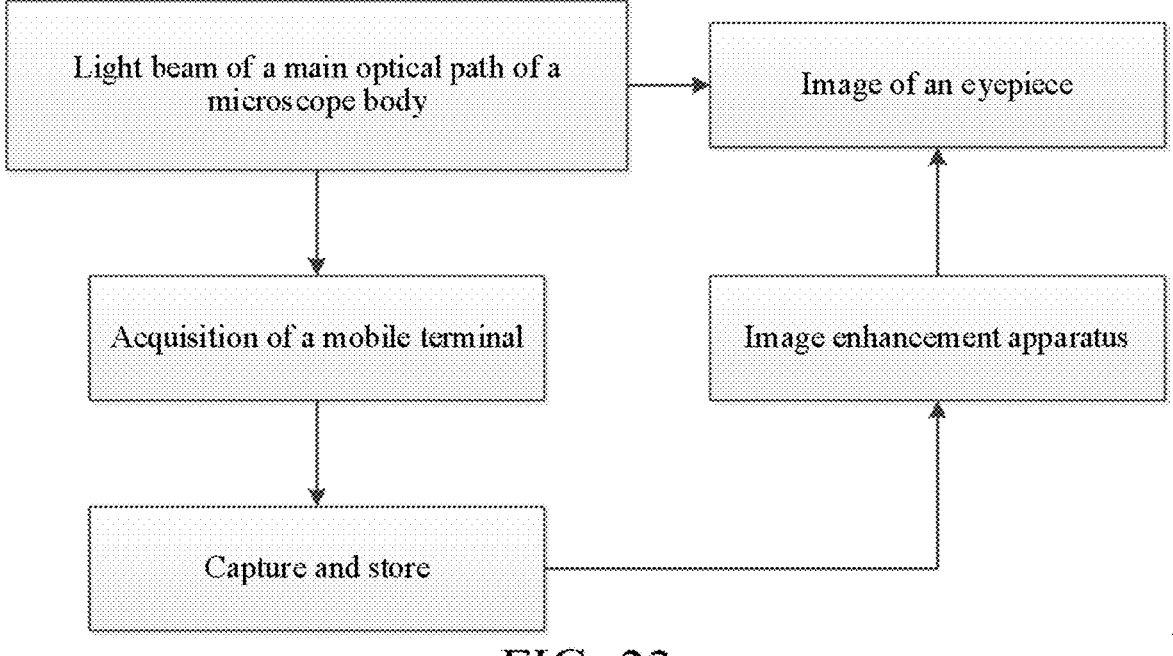
FIG. 23 is a schematic flowchart of a principle when a media signal processing apparatus is used as an acquisition device according to Embodiment 2 of this application.
Figures 24A, 24B:
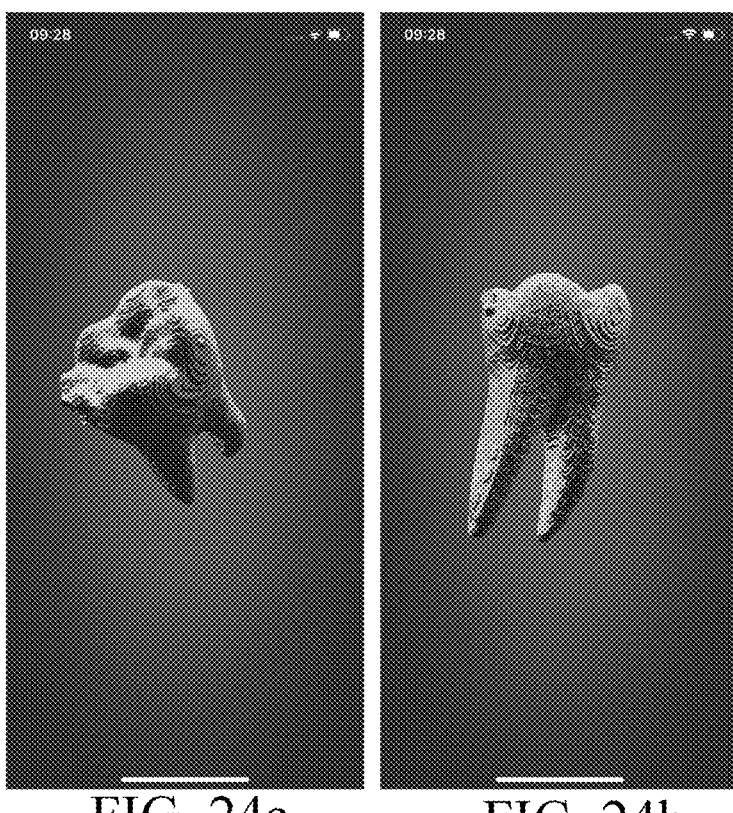
FIG. 24a to FIG. 24c are respectively schematic diagrams of interfaces when three-dimensional model software built in a media signal processing apparatus displays a target tooth at different angles according to Embodiment 2 of this application.
Figure 24C:
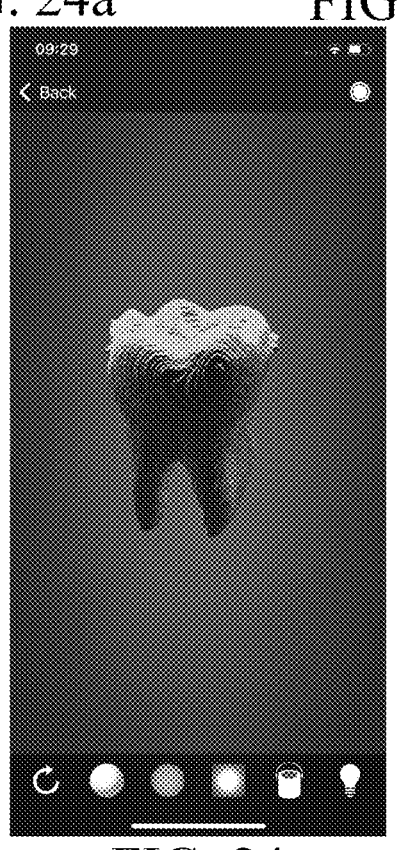
Figures 25A, 25B:
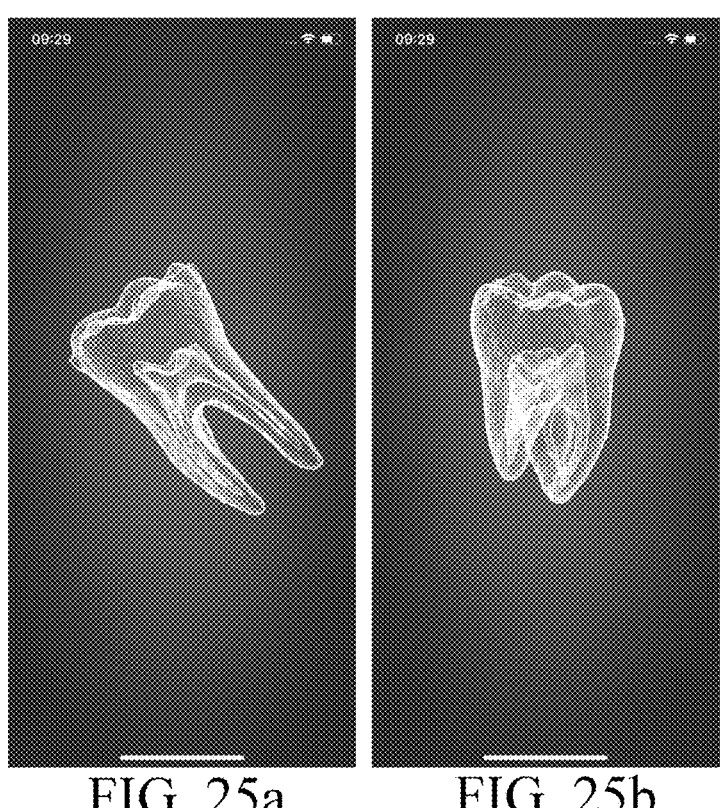
FIG. 25a to FIG. 25d are respectively schematic diagrams of interfaces when three-dimensional model software built in a media signal processing apparatus displays, at different angles, a target tooth whose state is changed according to Embodiment 2 of this application.
Figures 25C, 25D:
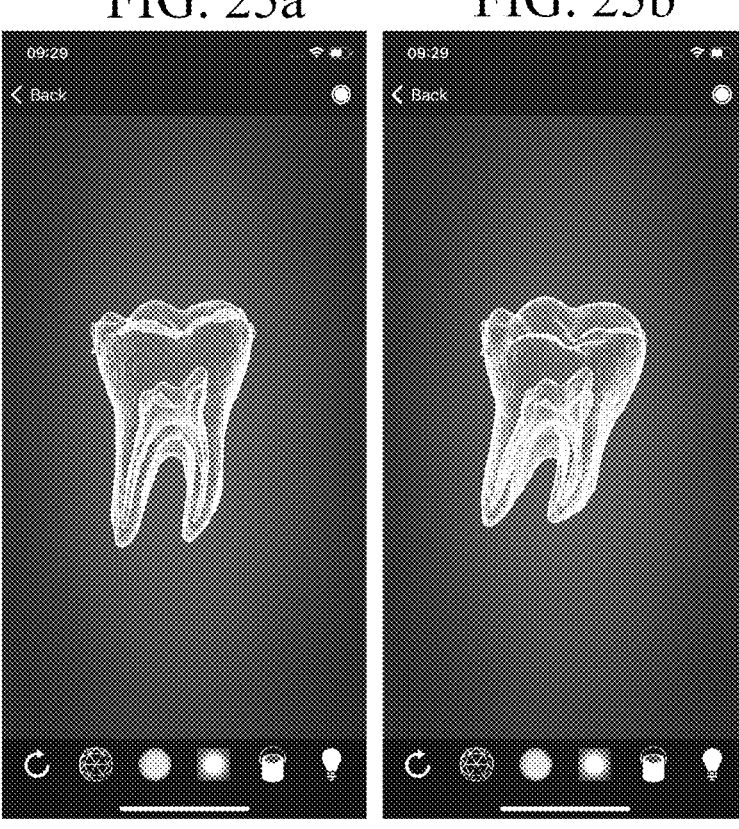

The media signal processing apparatus 4 and the display device 21 may be in a wired connection or may be in a wireless connection, for example, Bluetooth connection. Regardless of whether the wired connection or the wireless connection, a space occupation problem caused by a relatively large quantity of computer wires and a relatively large screen can be effectively resolved by using the mobile terminal as the media signal processing apparatus 4, to save the space and facilitate movement of the microscope body 1 and a cross arm of the microscope support 10. In addition, the media signal processing apparatus 4 may also be used as an acquisition device. Generally, the mobile terminal such as a touchscreen mobile phone or a tablet computer has an own camera, and a light beam emitted from the beam splitter interface 201 may be acquired by using the own camera to obtain an image observed in the microscope. For example, the operator may first capture and store the image observed in the microscope body 1 before the operation, and then call the image information previously captured through the media signal processing apparatus 4 during or after the operation, and then selectively transmit, through built-in software, the image information data to the display device 21 for display, to form a superposed image, and then observe and compare the images through an eyepiece. A main process is shown in FIG. 23. In this way, the operator can compare and analyze the images before the operation, during the operation, and after the operation more conveniently.

Further, three-dimensional model software may be built in the media signal processing apparatus 4, so that when three-dimensional model data information of the target tooth is imported into the media signal processing apparatus 4, the media signal processing apparatus 4 may process the three-dimensional model data, and display a three-dimensional model of the target tooth on a touch screen of the media signal processing apparatus 4, as shown in FIG. 24*a* to FIG. 24*c* and FIG. 25*a* to FIG. 25*d*. An angle, a size, or a transparency of the displayed three-dimensional model can be adjusted conveniently and quickly by touching the touch screen. Then, the three-dimensional model is selectively displayed in the information display region of the display device 21, so that the operator can flexibly and conveniently adjust the three-dimensional model image superposed to the main optical path of the microscope body 1, thereby facilitating observation of a tooth pulp cavity.

Figures 26A, 26B:
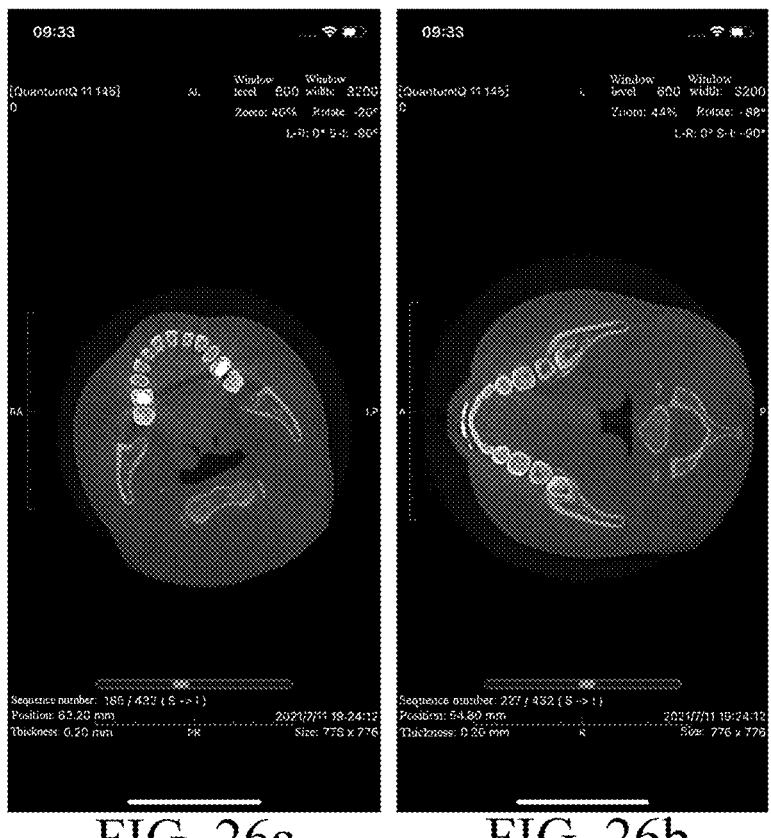
FIG. 26a to FIG. 26c are respectively schematic diagrams of interfaces when CPCT image software built in a media signal processing apparatus displays an image at different angles according to Embodiment 2 of this application.
Figure 26C:

Further, CBCT image software may be further built in the media signal processing apparatus 4, so that when CBCT image data is imported into the media signal processing apparatus 4, the media signal processing apparatus 4 may process the CBCT image data and display a CBCT image on the touch screen of the media signal processing apparatus 4, as shown in FIG. 26*a* to FIG. 26*c*, and further display information such as a position, a time, an image size, and a ruler in a display surface. An angle, a size, or a transparency of the displayed CBCT image may be adjusted by touching the touch screen, so that the operator can flexibly and conveniently adjust the CBCT image superposed to the main optical path of the microscope body 1.

In a further embodiment, a wireless charging module for charging the mobile terminal is disposed on the terminal support 9. The wireless charging module may be connected to a power supply of the microscope to implement power supply. When the media signal processing apparatus 4 is selected, a wireless terminal such as a touchscreen mobile phone or a tablet computer that can be wirelessly charged may be selected. In this way, the mobile terminal can be wirelessly charged at any time, thereby effectively resolving problems such as long-term work and insufficient power of the mobile terminal.

Figure 27:
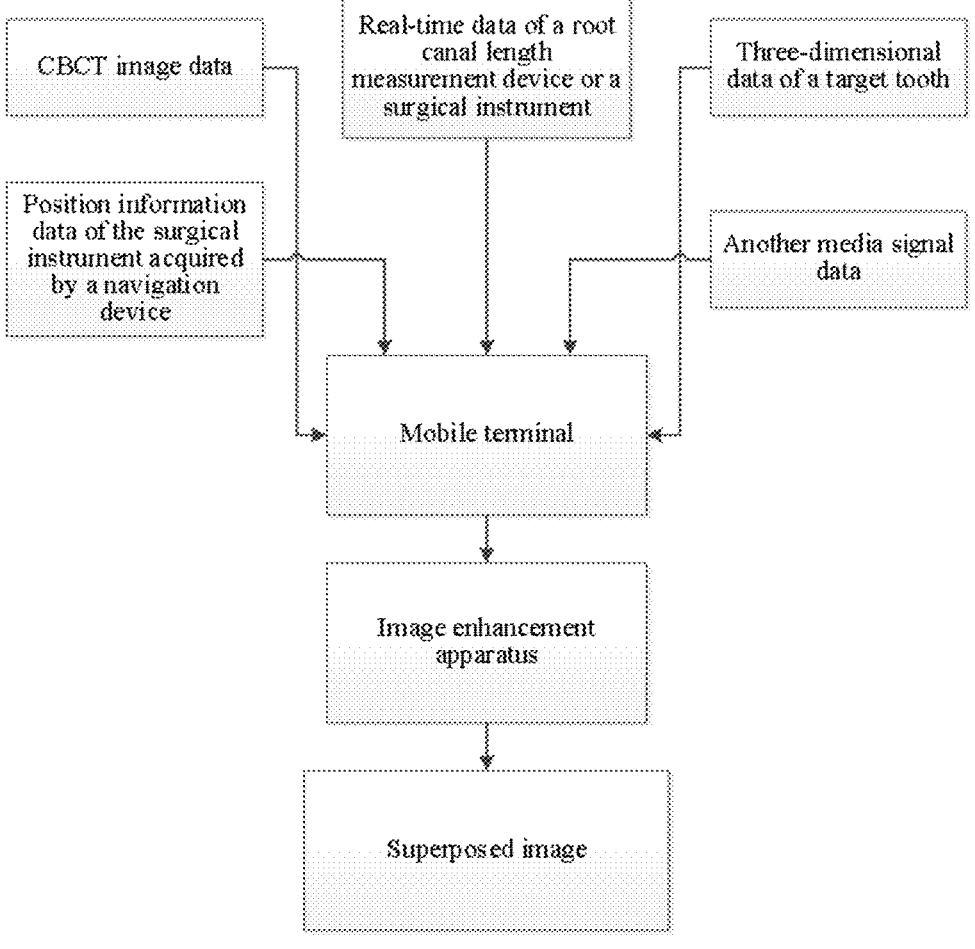
FIG. 27 is a schematic flowchart of an image enhancement system according to Embodiment 2 of this application.

In this embodiment, an implementation method for the image enhancement system mainly comprises the following steps shown in FIG. 27: importing information data of a target object into a media signal processing apparatus 4, wherein the media signal processing apparatus 4 may be another mobile terminal such as a touchscreen mobile phone (iPhone or an Android phone) or a tablet computer. The information data may be CBCT image data, position information data of a surgical instrument acquired by a navigation apparatus, real-time data of a root canal measurement device 11 or the surgical instrument, three-dimensional model data of a target tooth, another media signal data, and the like. The media signal processing apparatus 4 parses the imported information data, sends processed information data to a display device 21 of an image enhancement apparatus 2, and the display device 21 receives the information data, and converts the information data into an optical image 61 for display, wherein the optical image 61 displayed by the display device 21 is incident to a superposition lens group on a main optical path of a microscope body 1, and the optical image 61 displayed by the display device 21 is superposed to the main optical path to form a superposed image, and then the superposed image is incident to the binocular tube 3.

Compared with the related art, the image enhancement system and the implementation method therefor in this application have at least one or more following beneficial effects:

According to the image enhancement system and the implementation method therefor in this application, by using a display device such as an LCD, an OLED, or a DLP and in combination with a light splitting prism, image information displayed in the display device can be superposed to an observation field of view of a microscope, to facilitate an operator to observe a target object and quickly view a variety of data information related to an operation. Compared with a projector, the display such as the LCD, the OLED, or the DLP is smaller in volume, displays a clearer image, consumes less power, and also generates less heat. An HDMI signal may be inputted, and connection is simple and convenient. A structure is compact and does not occupy space. The media signal processing apparatus may be a computer independent of the microscope, or may be a part of the microscope, or may be a mobile terminal with a touch screen such as a touchscreen mobile phone or a tablet computer. The media signal processing apparatus may be configured to preprocess a plurality of signals such as patient case information, an oral holographic scanning image, CT, a CBCT image or 3D modeling information, and a root canal measurement device into one signal, and then output the signal to the display device of the image enhancement apparatus 2 for display. The media signal apparatus may process input CBCT image data through built-in software, re-establish a three-dimensional model of a target tooth, perform slicing processing on the three-dimensional model, and also highlight key parts of the tooth such as a root canal orifice and an edge contour, to allow superposed information to be more clearly observed when a slice image is superposed to a field of view region of an eyepiece. If a mobile terminal with a touch screen such as a touchscreen mobile phone or a tablet computer is used as the media signal processing apparatus, the operator can also conveniently and quickly adjust and control the CBCT image and the three-dimensional model of the target tooth. Compared with a conventional manner of controlling an image through a computer, the computer is operated by one person with a single hand without being equipped with a single assistant, to avoid inconvenience of a remote operation and greatly improve operation efficiency. In addition, space occupation caused by a relatively large quantity of computer wires and a relatively large screen can be further reduced, the space is saved, and it is more convenient to move the microscope and a cross arm of a microscope support without limiting an operation space of the operator and hindering the microscope from moving to an appropriate observation position. A wireless charging module may be disposed on a terminal support, and the mobile terminal can be wirelessly charged at any time, to effectively resolve problems such as long-term work and insufficient power of the mobile terminal. An information display region in the display device such as the LCD, the OLED, or the DLP matches an observation field of view of the microscope, and the information data processed by the media signal processing apparatus is displayed in the information display region, so that it can be ensured that the entire image is superposed to the field of view region of the eyepiece without being cut, and a case that the entire superposed information is displayed in an edge of the field of view and cannot be observed is avoided. A quantity, a size, a position, a direction, and an angle of the superposed information superposed in the field of view region of the eyepiece may be all adjusted as required, to adapt to different habit requirements of operators. The superposed information superposed in the field of view region of the eyepiece may be directly adjusted through a handle, a mouse, a keyboard, or the like, or may be controlled by acquiring biometric feature information such as user voice, a gesture, a facial expression, an eyeball action, a brain nerve wave, and a shape of a mouth, so that the operator completes an operation without a touch skill, and the operation is simple and quick. A region displayed in the display device other than a region in which the superposed information needs to be superposed is displayed in black. In this way, during optical path observation of the binocular tube 3, the image in the main optical path of the microscope body can be observed, and the image displayed in the display device can also be observed. Root canal therapy is used as an example, a slice image of CBCT of a tooth and a real image in the main optical path of the microscope body may be calibrated and then superposed and displayed, so that a highlighted dental pulp hole image may be superposed on a real tooth image, which greatly facilitates operation positioning for a doctor, reduces an operation difficulty, and improves operation accuracy. In combination with a positioning and navigation device, a surgical instrument can be positioned in real time, thereby further improving the operation accuracy.

In this specification, the terms "comprise", "comprise", or their any other variant is intended to cover a non-exclusive inclusion, so that not only those listed elements are comprised but also other elements which are not expressly listed are comprised.

In this specification, nouns of locality such as "front", "rear", "above", "below", and the like are defined according to components located in the drawings and location relationship between the component in the accompanying drawings, and is merely used for clarity and convenience for expressing the technical solutions. It should be understood that usage of the nouns of locality should not limit the protection scope of this application.

The foregoing embodiments and features in the embodiments may be combined with each other without conflict.

The foregoing descriptions are merely preferred embodiments of the present invention and are not intended to limit the present invention. Any modification, equivalent replacement, and improvement made without departing from the spirit and principle of the present invention shall fall within the protection scope of the present invention.

What is claimed is:

1. An image enhancement system, comprising a media signal processing apparatus, an image enhancement apparatus, a microscope body, and a binocular tube, wherein the image enhancement apparatus comprises a housing, a display device, and a superposition lens group, both the display device and the superposition lens group are located in the housing, the display device is communicatively connected to the media signal processing apparatus, the superposition lens group is disposed on a main optical path of the microscope body, the binocular tube is disposed on the microscope body, the display device is configured to receive information data sent by the media signal processing apparatus and convert the received information data into an optical image, the optical image sent by the display device is superposed to the main optical path of the microscope body through the superposition lens group to form a superposed image, and the superposed image can be observed through the binocular tube, wherein the image enhancement system further comprises a plurality of information input apparatuses, wherein the information input apparatuses are respectively communicatively connected to the media signal processing apparatus, and the media signal processing apparatus is configured to convert information data inputted by the plurality of information input apparatuses into composite information data and send the composite information data to the display device, wherein the information input apparatus comprises a positioning and navigation device, the positioning and navigation device is mounted on a surgical instrument, the positioning and navigation device is communicatively connected to the media signal processing apparatus, and the positioning and navigation device is configured to acquire position information of the surgical instrument in real time and input the position information into the media signal processing apparatus, and wherein the information input apparatus further comprises a root canal measurement device, the root canal measurement device is communicatively connected to the media signal processing apparatus, and the root canal measurement device is configured to measure length information of a root canal of a target tooth and input the length information into the media signal processing apparatus.

2. The image enhancement system according to claim 1, wherein the display device comprises an information display region, the information display region matches an observation field of view of the binocular tube, and an optical image corresponding to the composite information data converted by the media signal processing apparatus is displayed in the information display region; and the display device is an OLED display, an LCD display, or a DLP display, the optical image sent by the display device is black in a region outside the optical image corresponding to the composite information data.

3. The image enhancement system according to claim 2, further comprising an adjustment apparatus, wherein the adjustment apparatus is communicatively connected to the media signal processing apparatus, the adjustment apparatus is configured to input adjustment information into the media signal processing apparatus, and the media signal processing apparatus is configured to control, according to the adjustment information, on/off, a size, a position, and an angle of an image that is of the information data inputted by the information input apparatuses and that is displayed in the information display region, the image enhancement system further comprises an acquisition apparatus, wherein the acquisition apparatus is communicatively connected to the media signal processing apparatus, the acquisition apparatus is configured to acquire biometric feature information of a user in real time, and the media signal processing apparatus is configured to control, according to the biometric feature information, on/off, a size, a position, and an angle of an image that is of the information data inputted by the information input apparatuses and that is displayed in the information display region.

4. The image enhancement system according to claim 1, further comprising an image acquisition apparatus, wherein the image acquisition apparatus is communicatively connected to the media signal processing apparatus, and the image acquisition apparatus is configured to acquire image information in the main optical path of the microscope body in real time and input the image information to the media signal processing apparatus.

5. The image enhancement system according to claim 1, wherein the media signal processing apparatus is a mobile terminal, the media signal processing apparatus is the mobile terminal with a touch screen, and on/off, a size, a position, or an angle of a corresponding image of each piece of information data displayed in the display device is adjusted by touching the touch screen.

6. The image enhancement system according to claim 4, further comprising a terminal support, wherein the media signal processing apparatus is disposed on one side of the image enhancement apparatus or one side of the microscope body through the terminal support, a wireless charging module for charging the mobile terminal is disposed on the terminal support.

7. The image enhancement system according to claim 1, wherein the image enhancement apparatus further comprises a beam splitter group, the beam splitter group is disposed in the housing, a beam splitter interface is provided on one side of the housing, and the beam splitter group is capable of emitting a part of a light beam in the main optical path of the microscope body or a part of a light beam of the superposed image from the beam splitter interface, the media signal processing apparatus is configured to acquire the light beam emitted from the beam splitter interface.

8. The image enhancement system according to claim 4, wherein the media signal processing apparatus is configured to display a three-dimensional model, wherein an angle of the three-dimensional model is adjustable, and/or a size of the three-dimensional model is adjustable, and/or a transparency of the three-dimensional model is adjustable, the media signal processing apparatus is configured to display a CBCT image, wherein an angle of the CBCT image is adjustable, and/or a size of the CBCT image is adjustable, and/or a transparency of the CBCT image is adjustable.

9. An implementation method for an image enhancement system, comprising:

importing information data of a target object into a media signal processing apparatus;

processing the imported information data, and sending processed information data to a display device of an image enhancement apparatus by the media signal processing apparatus; and receiving the information data, and converting the information data into an optical image for display by the display device, wherein the optical image displayed by the display device enters a superposition lens group on a main optical path of a microscope body through a lens optical path, and the optical image displayed by the display device is superposed to the main optical path to form a superposed image, and then the superposed image enters a binocular tube, wherein the information data comprises CBCT image data, and after the CBCT image data is imported into the media signal processing apparatus, the media signal processing apparatus parses the CBCT image data, to obtain a three-dimensional image of an oral cavity of the target object, highlights key information in the three-dimensional image of the oral cavity of the target object, generates a four-view image, and selectively displays the four-view image in an information display region of the display device, and a target tooth is selected from any view image in the four-view image, and the media signal processing apparatus generates a three-dimensional image and a cross section cutting view of the selected target tooth, and selectively displays the three-dimensional image and the cross section cutting view in the information display region of the display device.

10. The implementation method for an image enhancement system according to claim 9, wherein the information data comprises three-dimensional model data of a target tooth, and after the three-dimensional model data of the target tooth is imported into the media signal processing apparatus, the media signal processing apparatus processes the three-dimensional model data and selectively displays processed three-dimensional model data in an information display region of the display device.

11. The implementation method for an image enhancement system according to claim 9, wherein the information data further comprises additional information data, and after the additional information data is imported into the media signal processing apparatus, the media signal processing apparatus processes the additional information data and selectively displays processed additional information data in an information display region of the display device.

12. The implementation method for an image enhancement system according to claim 9, wherein when sending the information data to the display device, the media signal processing apparatus first integrates all information data into composite information data, and then sends the composite information data to the display device (21) for display, wherein on/off, a size, a position, and an angle of a corresponding image of each piece of information data displayed in the display device are adjustable.

13. The implementation method for an image enhancement system according to claim 9, wherein an operation of parsing the CBCT image data by the media signal processing apparatus comprises:

obtaining a folder path in whictl the CBCT image data is located;

obtaining a DICOM sequence and sequence information, wherein the sequence information comprises a sequence path, a quantity of slices, and each picture;

selecting a sequence according to the sequence information, adding the sequence to a database, and outputting the sequence path;

parsing sequence basic information, storing parsed basic information into a sequence volume data structure, outputting sequence volume data information, and receiving, by a data control thread, the sequence volume data information and controlling image display and interaction, and during four-view image display and interaction, interactively selecting the target tooth on an interface, inputting the selected information into a tooth segmentation module for tooth segmentation, then outputting a divided tooth three-dimensional graph to the data control thread, and continuously maintaining, by the data control thread, image display and interaction.

14. The implementation method for an image enhancement system according to claim 13, wherein after the outputting the sequence path, the method further comprises:

parsing the sequence basic information, storing the parsed basic information into a sequence slice information base, and outputting the parsed basic information, and receiving, by an instance management module, the parsed basic information, and adding the parsed basic information to the database.

15. The implementation method for an image enhancement system according to claim 13, wherein during four-view image display and interaction, an exported path is interactively selected on the interface, the selected information is inputted into a path control module for storing and managing the path, and the data control thread continuously maintains image display and interaction.

16. The implementation method for an image enhancement system according to claim 9, wherein an image acquisition apparatus is disposed to acquire image information in the main optical path of the microscope body in real time and input the image information into the media signal processing apparatus, and the media signal processing apparatus performs matching according to the image information acquired by the image acquisition apparatus to obtain a cross section cutting view matching the target tooth in the image information in the main optical path, and superposes the cross section cutting view on an image of the target tooth.

17. The implementation method for an image enhancement system according to claim 9, wherein a positioning and navigation device is disposed on a surgical instrument to acquire position information of the surgical instrument in real time and input the position information into the media signal processing apparatus, and the media signal processing apparatus processes image data of the target tooth to obtain an optimal path for operating the target tooth, and then selectively display the position information of the surgical instrument and relative position information between the surgical instrument and the optimal path in the information display region of the display device.

*    *    *    *    *